United States Patent [19]

Diachuk

[11] Patent Number: 5,669,947
[45] Date of Patent: Sep. 23, 1997

[54] LATCH FOR MODULAR AIR HANDLING SYSTEM

[75] Inventor: Wolodymyr Diachuk, Golden Valley, Minn.

[73] Assignee: Helical Dynamics, Inc., Golden Valley, Minn.

[21] Appl. No.: 576,340

[22] Filed: Dec. 21, 1995

Related U.S. Application Data

[62] Division of Ser. No. 409,828, Mar. 23, 1995, Pat. No. 5,637,124.

[51] Int. Cl.$^6$ .................................................. B01D 50/00
[52] U.S. Cl. .................... 55/342; 55/385.1; 55/478; 55/483; 55/502
[58] Field of Search ...................... 55/341.3, 341.5, 55/342, 343, 350.1, 385.1, 385.2, 385.4, 478, 480, 482, 483, 485, 502, 385.7, 481, 422

[56] References Cited

U.S. PATENT DOCUMENTS

| | | | |
|---|---|---|---|
| 1,426,196 | 8/1922 | Jordahl | 55/483 |
| 1,676,969 | 7/1928 | Sution et al. | 209/502 |
| 3,246,456 | 4/1966 | Sharp | 55/502 |
| 3,247,652 | 4/1966 | Annas et al. | 55/481 |
| 3,340,788 | 9/1967 | Landingham et al. | 454/59 |
| 3,370,404 | 2/1968 | Leeper | 55/483 |
| 3,425,335 | 2/1969 | Black | 454/57 |
| 3,570,220 | 3/1971 | Felter | 55/385.7 |
| 3,759,017 | 9/1973 | Young | 55/493 |
| 3,864,107 | 2/1975 | Baigas, Jr. | 55/482 |
| 4,038,056 | 7/1977 | Diachuk et al. | 55/238 |
| 4,050,368 | 9/1977 | Eakes | 454/57 |
| 4,125,062 | 11/1978 | Eakes | 454/56 |
| 4,216,003 | 8/1980 | Diachuk | 55/356 |
| 4,284,236 | 8/1981 | Bradshaw | 236/49.3 |
| 4,350,504 | 9/1982 | Diachuk | 422/105 |
| 4,364,754 | 12/1982 | Diachuk | 55/269 |
| 4,377,397 | 3/1983 | Clements | 95/286 |
| 4,382,807 | 5/1983 | Diachuk | 55/269 |
| 4,460,386 | 7/1984 | Diachuk | 95/220 |
| 4,902,315 | 2/1990 | Spicer | 95/273 |
| 5,023,116 | 6/1991 | Williams | 427/424 |
| 5,024,681 | 6/1991 | Chang | 95/70 |
| 5,110,331 | 5/1992 | Williams | 55/302 |
| 5,120,335 | 6/1992 | Gorlich et al. | 55/457 |
| 5,129,930 | 7/1992 | Gauthier et al. | 55/394 |
| 5,133,246 | 7/1992 | Campbell | 454/52 |
| 5,133,690 | 7/1992 | Bone | 454/51 |
| 5,178,656 | 1/1993 | Gauthier et al. | 55/450 |
| 5,223,008 | 6/1993 | Troxell | 55/350.1 |

OTHER PUBLICATIONS

Professor Wm. C. Hienz, Aerosol Technology Property and Behavior and Measurement of Airborne Particles, "The Mechanics of clouds are more complicated than that for individual particles and a complete description does not exist." (Chapter 17, p. 347).

Helical Dynamics Brochure "Heli–Flo System Plenu–Flo Duct System" Jun. 15, 1991.

*Primary Examiner*—Jay H. Woo
*Assistant Examiner*—Duane S. Smith
*Attorney, Agent, or Firm*—Patterson & Keough, P.A.

[57] ABSTRACT

A substantially sealed modular air handling system that has a plurality of modules enclosing a plurality of air handling units. Each of the modules has generally parallelpiped shaped cabinetry having two opposed sides and opposed front and rear faces. The plurality of air handling units has a plurality of common components designed to seal and readily mate the modules to one another in a plurality of selected configurations, to provide ready access to the air handling units enclosed therein via the front and rear faces thereof and to present an external surface that is substantially free of protruding devices which may pose a safety hazard to personnel. A selected one of the common components is an access door latch, having a latch frame operably, fixedly coupled to the cabinetry, the latch frame having a first flush portion disposed flush with the external surface of the cabinetry.

9 Claims, 13 Drawing Sheets

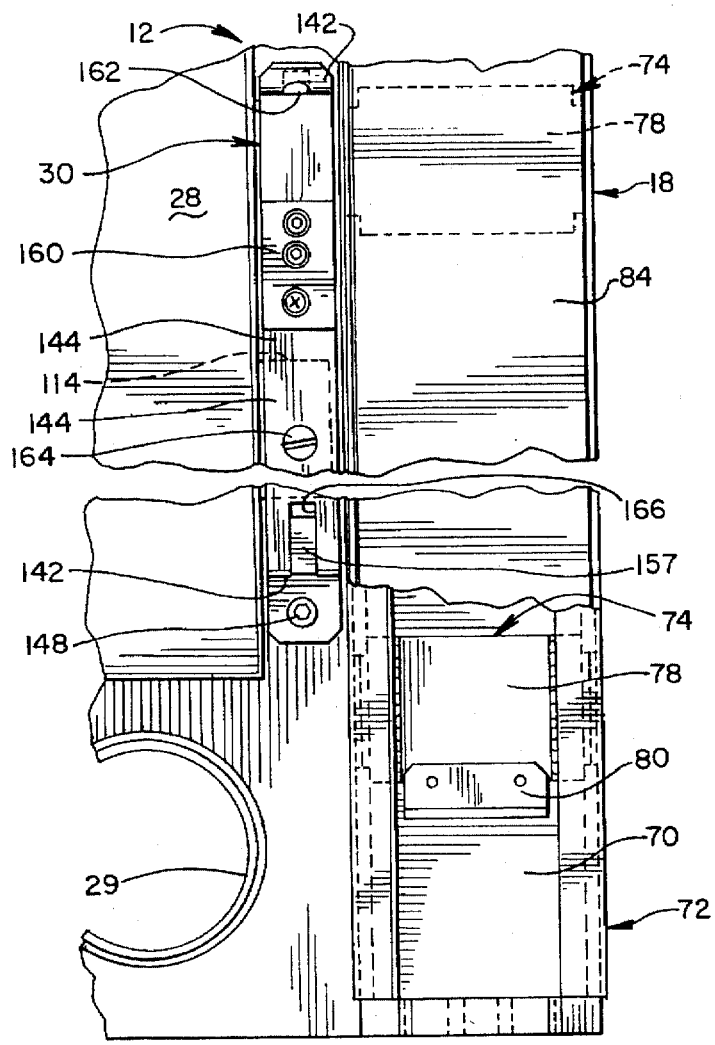
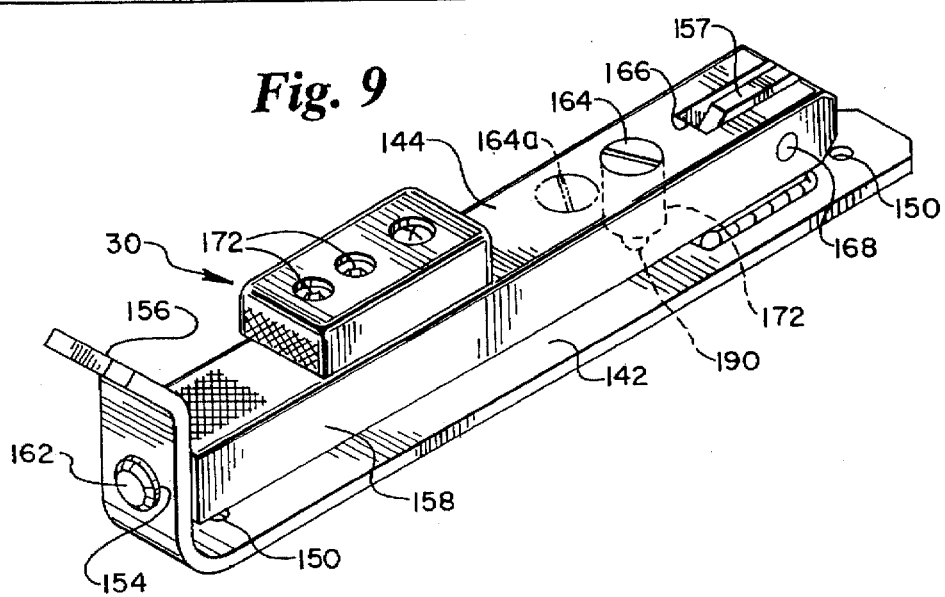

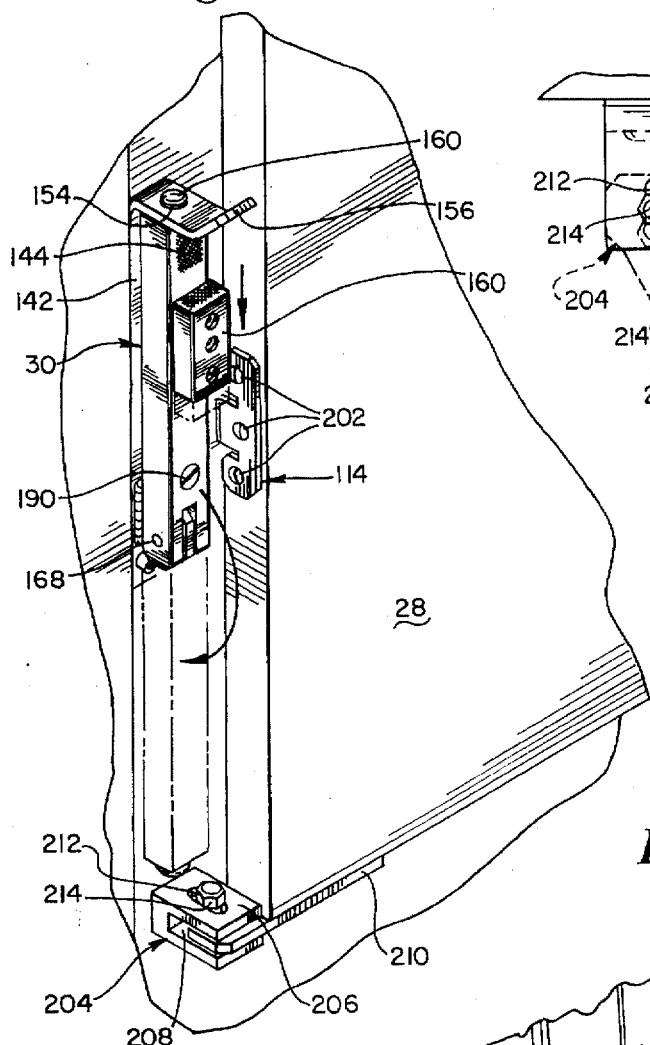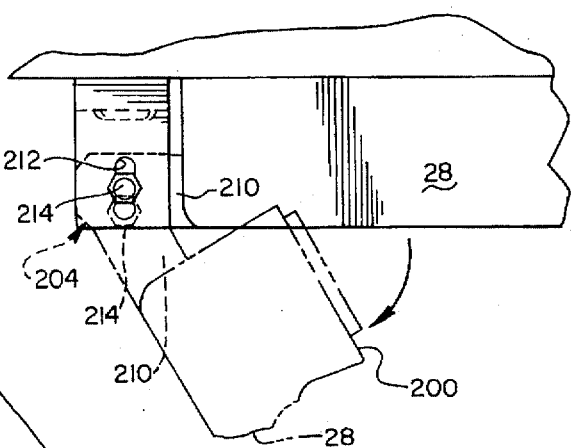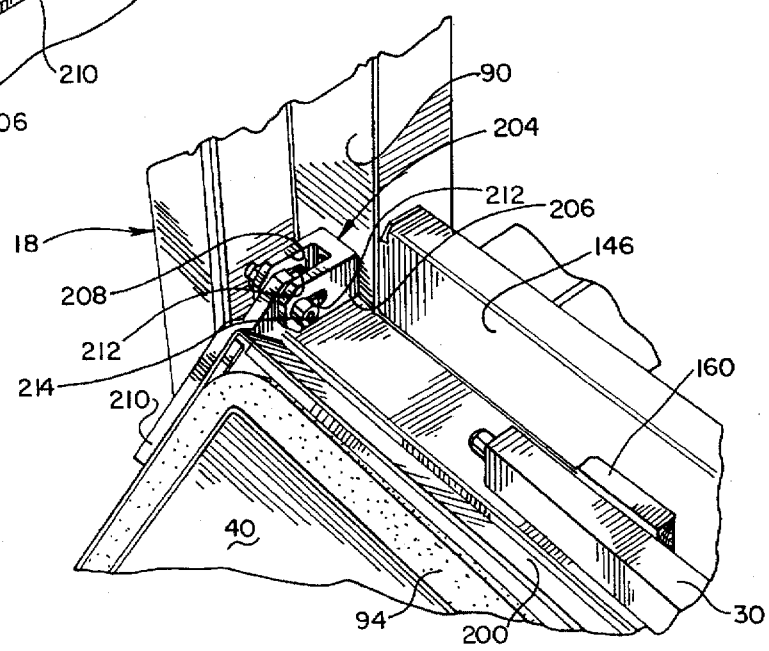

LATCH FOR MODULAR AIR HANDLING SYSTEM

This is a Divisional of application Ser. No. 08/409,828, filed Mar. 23, 1995, now U.S. Pat. No. 5,637,124.

TECHNICAL FIELD

This invention relates to a modular air cleaning system for removing unwanted materials from the air. More particularly, the present invention relates to a modular air cleaning system for the removal of materials comprising both dry and moist contaminants from the air drawn from proximate a mechanical industrial process, especially a process that utilizes a coolant liquid.

BACKGROUND OF THE INVENTION

There is a growing need to remove foreign contaminant material from the air from proximate a mechanical industrial process. Such material may be either dry, as in the form of smoke, or moist, as in the form of a mist. Such contaminant materials are typically produced from the milling and shaping operations of materials such as metal and ceramics. Many of such materials are being recognized as comprising a significant hazard to individuals exposed thereto. A material that has come under intense scrutiny in the last few years is the machine oil used to cool tools during the milling and shaping of materials. Firms utilizing such milling and shaping operations are feeling a growing need to capture such materials proximate the source and remove them from the air. Regulations that govern such contaminants promise to grow more stringent as their full potential hazards are recognized.

The milling and shaping operations of mechanical industrial process may be performed in newly constructed facilities, where the devices to cleanse the air are incorporated when the production line is first laid down. The greater challenge is to capture such contaminant materials produced on production lines that exist in old facilities. When the production lines were laid down in such facilities, the need to capture and remove such materials from the air was not recognized. Accordingly, the production lines in such facilities typically have minimal floor space available in which to install air cleansing devices. Accordingly, it is desirable that such cleansing devices have a minimal foot print in order to be capable of being installed in the minimal floor space available or are adaptable to being installed in the truss space located above the production line. Such requirements require an air cleansing system that has readily adaptable exterior dimensions and flexibility of design in order to accommodate a wide variety of existing conditions in a facility that is already fully laid out.

It is desirable that an air cleaning system that is adaptable to being readily retrofitted in a facility with an existing production line be capable of relatively long continuous operation between required cleaning maintenance. This is especially true if the air cleaning system is to be installed-in the relatively inaccessible truss space of the facility. Typically, such maintenance requires that the production line be shut down while the air cleansers are cleaned. A preferred way to minimize such cleaning maintenance is to provide an upstream air filtration unit that is resistant to clogging to substantially cleanse the air prior to filtration by a filter unit that is susceptible to clogging. Along with this, is the need for ease in changing filters. It is desirable that such filters be changed readily from outside the confines of the air cleanser. The necessity of having maintenance personnel enter the air cleansing system enclosure in order to change the filters can be both dangerous and time consuming.

An air cleaning system produced by the assignee of the present application is the HELI-FLO® System. The HELI-FLO® System consists of an inlet chamber, Helical Tubes/coalescing chamber, final filter chamber and fan, mounted in a single enclosure. Another cleaning system is that described in U.S. Pat. No. 4,216,003 to Diachuk. The gas cleaning system is mounted in a unitary cabinet and has rails disposed proximate the top of the cabinet with upwardly directed pockets from which the filter component depends. Neither the cabinet structure of the '003 patent nor the mounting structure from which the filter component depends is or teaches the structure of the present invention.

SUMMARY OF THE INVENTION

The modular design of the modular air cleaning system of the present invention substantially meets the requirements previously set forth above. The modular air cleaning system has modularity of design of the components comprising the various units that make up the modular air cleaning system. The universal corner post design of the modular air cleaning system is utilized regardless of the size of the unit being constructed. The corner post of the modular air cleaning system is designed to absorb abuse, to be a lifting structure for lifting the unit, to be a mounting structure for mounting the various components within the unit, and to be a support structure providing structural integrity to the unit. The corner post design is also capable of being adapted for use in connecting sections of duct work.

A single latch design and hinge design is utilized on all access doors of the various units comprising the modular air cleaning system. A single type and shape of gasket material is utilized universally throughout the units making up the modular air cleaning system to seal the unit cabinet structure, the access doors, and the filter components in the various units.

The modular air cleaning system has modularity of unit design built in. Such modularity of unit design provides for stacking of units to minimize the footprint of the modular air cleaning system. Additionally, the units of the modular air cleaning system may be oriented in line and mounted in the truss space above a production line or spaced apart and interconnected by means of duct work. Additionally, specialized cleaning units that are unique to the contaminated airstream that is being cleansed are capable of being disposed between the units making up the modular air cleaning system.

To maximize the operational time between required cleaning maintenance, the modular air cleaning system utilizes a helical filtration unit. Such filtration unit is as detailed in U.S. Pat. No. 4,460,386, issued Jul. 17, 1984, assigned to the assignee of the present invention and incorporated herein by reference. The helical filtration unit is highly resistant to clogging and at the same time removes approximately 99% of the mist borne materials. A Hepa filter is utilized downstream of the helical filtration unit. The Hepa filter is substantially protected from contamination by the helical filter unit. Accordingly, the components that comprise the Hepa filter need be changed only at intervals typically measured in months.

BRIEF DESCRIPTION OF THE DRAWINGS

FIG. 8 is a side elevational view of the corner post as used at the lower right front of the helical filter unit with a portion of the post shell broken away;

FIG. 9 is a perspective view of a door latch;

FIG. 12 is a perspective view of a door latch and an access door mounted on a hinge;

FIG. 13 is a top view of an access door and a hinge with the door in an open position depicted in phantom;

FIG. 14 is a perspective view of an open door mounted on a hinge in and an open latch recessed in a recess formed between the corner post and the access door;

FIG. 15b is a sectional view of the Hepa filter supporting roller taken along the section lines 15b—15b of the FIG. 15a;

DETAILED DESCRIPTION OF THE DRAWINGS

Figure 1:
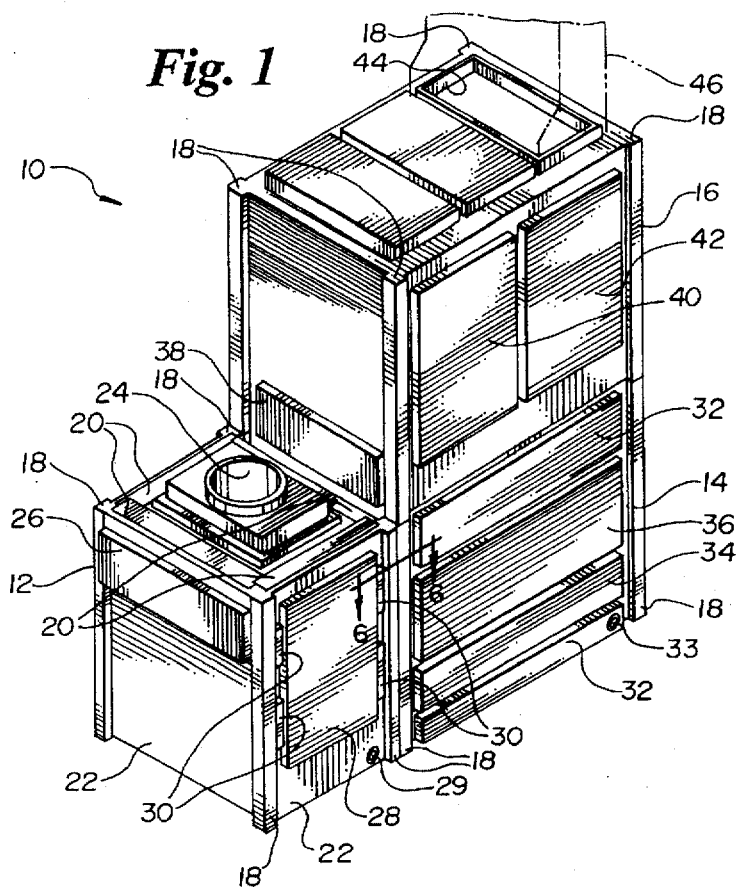
FIG. 1 is a perspective view of the modular air cleaning system of the present invention comprising the helical filter unit, the Hepa filter unit, and the fan and motor unit.

FIG. 1 depicts the modular air cleaning system generally at 10. The modular air cleaning system 10 has three major components; the helical filter unit 12, the Hepa filter unit 14, and the fan and motor unit 16. Each such units 12, 14, and 16 is an individual module, capable of being joined together in a plurality of selected configurations or employed in a plurality of selected spaced apart configurations connected by duct work. Like numbers denote like components throughout the description of the various figures.

The helical filter unit 12 is formed in a generally rectangular shape, having a vertical corner post 18 at each corner thereof. The corner posts 18 are joined by cross members 20 extending therebetween. The cabinet walls 22 are affixed to the corner posts 18 and the cross members 20 by sheet metal screws. The cabinet walls 22 are preferably formed of stainless steel sheet material. An air intake 24 is provided in the top of helical filter unit 12. Duct work (not shown) that conveys the contaminant material laden air from proximate the machine operation to the modular air cleaning system 10 is typically coupled to the air intake 24. For use where the overhead space is limited, an alternative side entry air intake is provided by removal of air intake panel 26, when desired. In such cases, the air intake 24 would typically be sealed off by a panel similar to air intake panel 26. It should be noted that air intake panel 26 is recessed, such that the outer surface of the air intake panel 26 is flush with the side surfaces of corner posts 18 and a recess is defined therebetween.

A side hinged access door 28 is provided in a front of the helical filter unit 12. The access door 28 facilitates the installation and removal of a helical filter tray and visual inspection thereof. Four latches 30 are provided to effect an air tight seal between the access door 28 and the cabinet wall 22.

In the configuration of FIG. 1, the helical filter unit 12 is bolted to the Hepa filter unit 14. An air passageway (not shown) is defined in the lower portion of the adjoining walls (not shown) of the helical filter unit 12 and the Hepa filter unit 14 in order to accommodate the flow of exhaust air from the helical filter unit 12 to the lower intake portion of the Hepa-filter unit 14. It is understood that the helical filter unit 12 is spaced apart from the Hepa filter unit 14 with duct work therebetween providing such air passageway in certain applications.

The Hepa filter unit 14 is generally rectangular in shape and is formed around four corner posts 18. The wails (not shown) of the Hepa filter unit 14 are preferably formed of stainless steel sheets.

The front of the depicted embodiment of the Hepa filter unit 14 includes two structural panels 32, extending between the corner posts 18, and two access doors 34, 36. The front surface of the structural panels 32 and the front surface of access doors 34, 36 are coplanar with the front surface of the two corner posts 18 on either side thereof, so that no structural components extend beyond such plane. This structure also defines recesses along the side margins and top and bottom margins of the access doors 34, 36. The door hardware, including hinges and latches 30 are mounted within such recesses. Such mounting results in no structural protrusions beyond the plane defined by the front surface of the corner posts 18 and the front surface of the structural panels 32 and access doors 34, 36.

The access door 34 is hinged at the bottom and provides access to the waste and coolant collection area beneath the Hepa filters. The access door 36 is hinged at the bottom and provides access to the Hepa filters. As will be seen, the Hepa filters may be readily removed and replaced through the access door 36 without the necessity of having the maintenance personnel enter the Cabinet of the Hepa filter unit 14.

In the configuration depicted in FIG. 1, the fan and motor unit 16 is stacked on top of the Hepa filter unit 14. Such stacking minimizes the footprint of the modular air cleaning system 10 in a desired application. It is understood that the fan and motor unit 16 could as well be mounted along side the Hepa filter unit 14 such that the helical filter unit 12, the Hepa filter unit 14 and the fan and motor unit 16 are oriented in an in-line configuration. Such configuration minimizes the heighth dimension of the modular air cleaning system 10 and is useful for mounting the modular air cleaning system 10 in a space with limited overhead dimensions such as in the truss space of a building, above a production line.

The fan and motor unit 16 is formed in a generally rectangular shape and has the same length and width dimensions as the Hepa filter unit 14 to facilitate the stacking of the fan and motor unit 16 thereon. The structure of the fan and motor unit 16 is also formed around four corner posts 18. A joining air passageway (not shown) is formed between the top of the Hepa filter unit 14 and the bottom of the fan and motor unit 16 in order to facilitate the flow of air therebetween. The fan of the fan and motor unit 16 acts to draw the contaminated air from the vicinity of the machine operation, through the helical filter, and through the Hepa filter to de exhausted as a clean air stream. A side panel 38, that is recessed between the corner posts 18 on either side thereof, may be removed to provide an air intake passageway when the Hepa filter unit 14 and the fan and motor unit 16 are oriented in a side by side configuration.

Two side hinged access doors 40, 42 are provided in the front face of the fan and motor unit 16. The front surface of the access doors 40, 42 is coplanar with the front surface of the corner posts 18 on either side thereof. The hardware for hinging and latching the access doors 40, 42 is mounted in the recesses formed between the doors 40, 42 and the corner posts 18 such that no portion thereof breaks the plane formed by the front surface of the corner posts 18.

In the preferred embodiment, one or more squirrel cage type fan motors are mounted within fan and motor unit 16. An air exhaust 44 is defined in the top of fan and motor unit 16. An exhaust duct 46, depicted in phantom is affixed thereto for conveying the cleansed air from the modular air cleaning system 10. The exhaust duct 46 may be configured such that the exhaust duct 46 exhausts the cleansed air within the confines of the building within which the modular air cleaning system 10 is mounted or the exhaust air may be exhausted outside such building, as desired.

Figure 2:
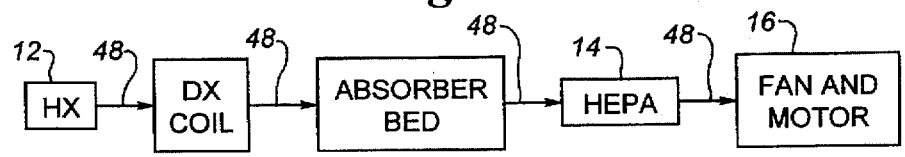
FIG. 2 is a schematic representation of the modular air cleaning system with a diffuser coil and absorber bed disposed between the helical filter unit and the Hepa filter unit.
Figure 3:
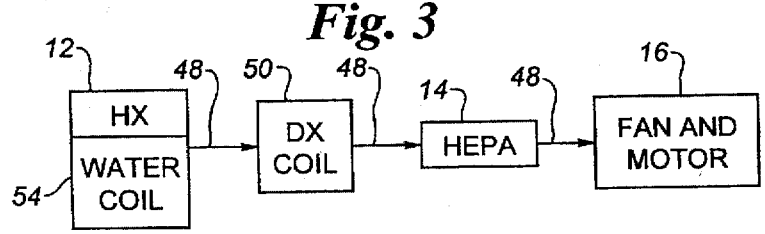
FIG. 3 is a schematic representation of the modular air cleaning system having a cooling water coil associated with the helical filter unit and a diffuser coil being disposed between the helical filter unit and the Hepa filter unit.

FIGS. 2–5 depict the flexibility that results from the modularity of the modular air cleaning system 10. In each figure, the modular air cleaning system 10 is comprised of at least the three modules comprising the helical filter unit 12, the Hepa filter unit 14 and the fan and motor unit 16. Such modular units are spaced apart and connected by duct work 48. In FIGS. 2 and 3, additional cleansing components have been added in order to enhance the cleansing operation. Such additional cleansing components are utilized particularly when the mechanical machine operation results in the production of contaminants that have some unique cleansing requirements. In FIG. 2, a diffuser coil 50 and absorber bed 52 have been disposed between the helical filter unit 12 and the Hepa filter unit 14. The diffuser coil 50 is similar to that used in refrigeration system and can condense certain materials out from the air flow. The absorber bed 52 may be of activated charcoal to further cleanse the air flow. In each case, the diffuser coil 50 and the absorber bed 52 are housed in modular units having similar components as the modular units 12, 14, and 16.

The configuration depicted in FIG. 3, a cooling water coil 54 has been associated with the helical filter unit 12. The water coil 54 acts to cool the air flow from the helical filter unit 12. Such cooled air flow increases the efficiency of the diffuser coil 50.

Figure 4:
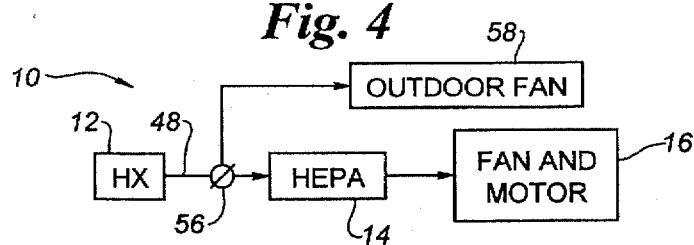
FIG. 4 is a schematic representation of the modular air cleaning system having a valve disposed between the helical filter unit and the Hepa filter unit for selectively discharging the cleansed air from the helical filter unit to the outdoor environment.

In the configuration of the modular air cleaning system 10 depicted in FIG. 4, the modules that comprise the helical filter unit 12, the Hepa filter unit 14, and the fan and motor unit 16 are spaced apart and connected by duct work 48. An air valve 56 has been disposed in the duct work 48 between the helical filter unit 12 and the Hepa filter unit 14. Such air valve 56 selectively directs the air exhaust from the helical filter unit 12 to an outdoor fan 58 or to the Hepa filter unit 15. The helical filter unit 12 is a highly efficient unit that typically removes approximately 99% of the unwanted material in the air flow. The air stream exhausted from the helical filter unit is safe to be exhausted to the ambient air outside the facility in which the modular air cleaning system 10 is mounted. During periods of warm weather, it may be desirable to exhaust such cleansed air outside. In this case, the outdoor fan 58 provides the motor flow energy to draw the air through helical filter unit 12. When the weather is cooler, it may be desirable to retain the heated cleansed air within the facility. In such case, the air valve 56 is oriented to direct the exhaust from the helical filter unit to the Hepa filter unit 14. In this case the outdoor fan 58 is deenergized in the fan and the fan and motor unit 16 is activated in order to provide the motive force for drawing the contaminated air through the helical filter unit 12 and the Hepa filter unit 14.

Figure 5:
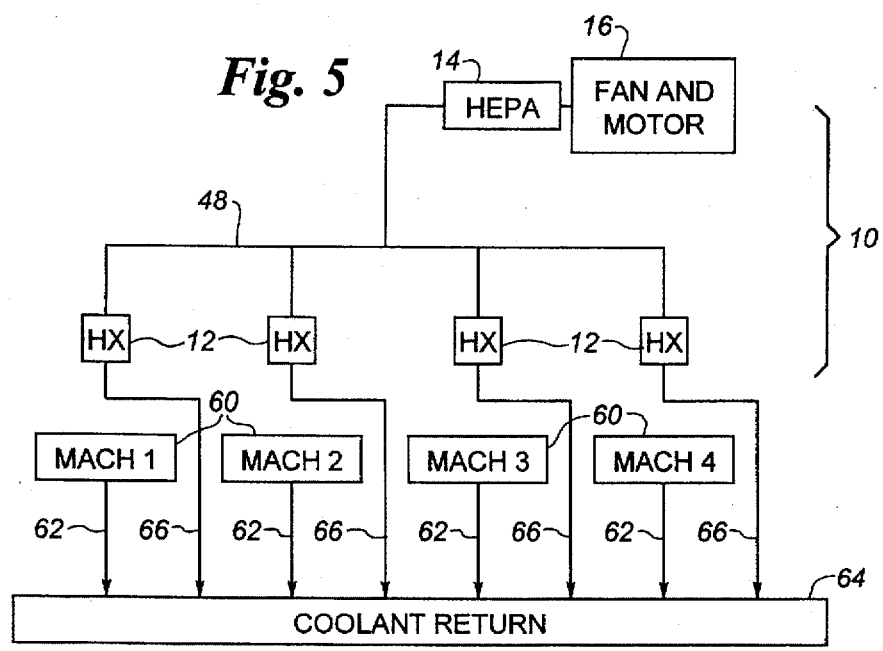
FIG. 5 is a schematic representation of the modular air cleaning system wherein a helical filter unit is associated with each machine operation and a single Hepa filter unit further filters the air received from the plurality of helical filter units.

The configuration depicted in FIG. 5 has a dedicated helical filter unit 12 associated with each forming machine 60. The forming machine 60 may be milling or shaping machines that utilize a machine oil as coolant. The coolant is removed from the vicinity of the forming machines either by flowing as droplets through the coolant scavenge lines 62 to the coolant return 64 or being drawn off in a mist to the helical filter unit 12. The helical filter unit 12 removes a substantial portion of the coolant from the air. Such coolant flows from the drain 29 of the helical filter unit 12 through drain line 66 to the coolant return 64. The coolant in the coolant return 64 may then be cleansed and reused to cool the forming operations, as desired.

The air from the plurality of helical filter units 12 is drawn through duct work 48 to Hepa filter unit 14 by fan and motor unit 16. The relatively large Hepa filter unit 14 and fan and motor unit 16 is utilized to service the plurality of helical filter units 12.

Figure 6:
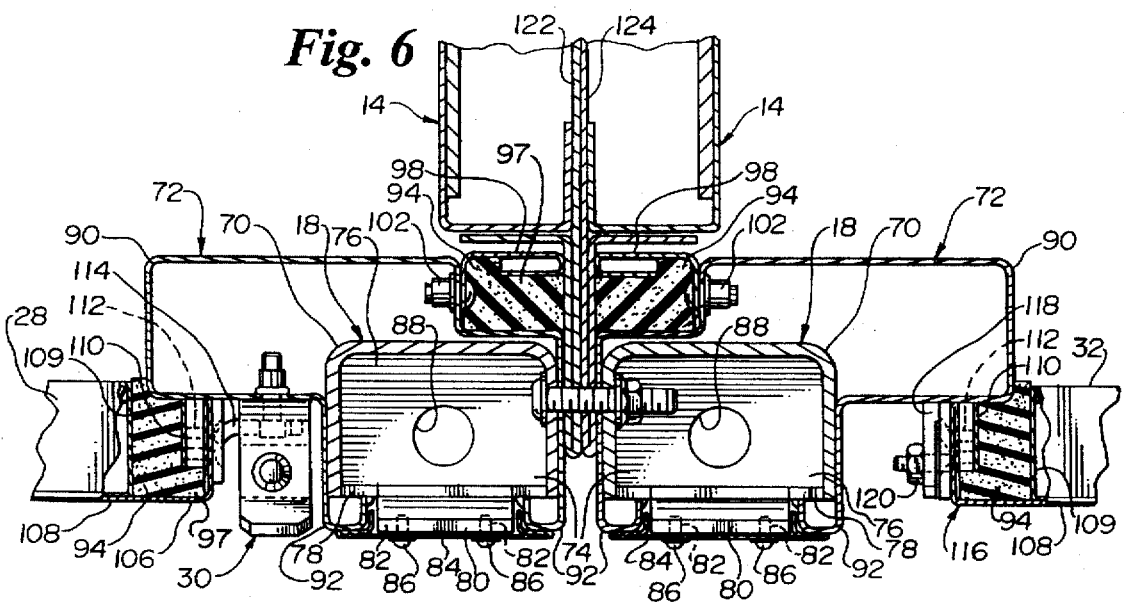
FIG. 6 is an end view of the corner posts of two connected adjoining units of the modular air cleaning system.

FIG. 6 depicts the adjoined corner posts 18 of two joined modular units of a modular air cleaning system 10, such as the joined helical filter unit 12 and Hepa filter unit 14 as depicted in FIG. 1.

The corner posts 18 have two major components; channel 70 and post shell 72. The channel 70 is preferably formed of a stainless steel material and has a substantial thickness thereto in order to provide the necessary structural support. The channel 70 may be approximately two tenths of an inch thick. Channel 70 is formed in a U shape, having three closed sides and an open side. As used in modular air cleaning system 10, the open side of the corner posts 18 faces outward, toward the front of the modular unit for the corner posts 18 that form the front corners of the unit and toward the rear of the modular unit for the corner posts 18 that form the rear corners of the unit.

In order to increase the structural integrity of the channel 70, a plurality of tie plates are welded to the channel 70. The tie plates 74 are T shaped having a first planar member 76 shaped to substantially conform to the inner dimensions of the channel 70. A second planar member 78 is oriented transverse to the first planar member 76 and is sized to extend across the open side of the channel 70. The second planar member 78 has a heighth dimension that is preferably approximately two inches.

A tie plate 74 is disposed proximate the top of the corner post 18 and proximate the bottom of the corner post 18. A plurality of tie plates 74 are disposed between such top and bottom tie plate 74, the number of such tie plates depending upon the heighth of the corner post 18. The top and bottom tie plates 74 have an outwardly directed curled lip 80, curled lip 80 has threaded bores 82 formed therein. A cover plate 84 that is substantially coextensive to the heighth dimension of the corner post 18 covers the open side of the channel 70 and is affixed to the lip 80 of the top and bottom tie plates by machine screws 86. Cover plate 84 is primarily decorative in nature.

A central bore 88 is defined in the first planar member 76 of each of the tie plates 74.

The post shell 72 substantially encloses the closed sides of channel 70. Post shell 72 is formed of substantially later cage steel than channel 70 and is welded thereto. The post shell 72 additionally defines an inwardly directed component bearing section 90 that extends inward from the channel 70. The component section 90 provides suitable surfaces upon which to mount the various components forming the cabinets of the helical filter unit 12, the Hepa filter unit 14, and the fan and motor unit 16, as will be described. The post shell 72 has curled ends 92 that wrap around both ends of the open side of the channel 70. The curled ends of post shell 72 meet the second planar member 78 of the tie plate 74, defining a plane therewith and are joined thereto by a weldment. The cover plate 84 overlies a portion of the curled ends 92 of the post shell 72.

In a preferred embodiment, a steel plate (not shown) having a thickness of approximately one half inch is formed to conform substantially to the exterior shape defined by the post shell 72 and extending across the open mount of channel 70. Such a plate is welded to both the top and bottom of corner posts 18. A bore is provided in such end plate that is in registry with central bore 88 of tie plate 74. Eyes for lifting the unit of modular air cleaning system 10 may be suitably installed in such bore of the four corner posts 18 of a modular unit. Additionally, the modular unit may be affixed to the surface upon which the modular unit is standing by a bolt sunk into such surface and passing through such bore of the end plate welded to the bottom of the corner posts 18. Further, the stacked modular units, such as the Hepa filter unit 14 and the fan and motor unit 16, as depicted in FIG. 1, are fixedly joined at the corner posts 18 thereof by a bolt that is passed through such bores of the end plate welded to the bottom of the stacked corner posts 18, such bores being brought into registry.

A common gasket shape, formed of a common material is used throughout to seal the inner compartments of the modular units that comprise the helical filter unit 12, the Hepa filter unit 14, and the fan and motor unit 16. The gasket 94 is formed of a compressible, closed cell material. The gasket 94 is formed in a generally L shape with the longer leg of the L shape having substantial thickness in comparison to the shorter leg of the L shape. A gasket channel 96, defined in the corner post 18, is formed cooperatively by gasket retainer 98 and a portion of the component bearing section 90 of the post shell 72. The gasket retainer 98 is formed in a generally L shape with a curved end. A first leg 100 of the gasket retainer 98 is affixed to the component bearing section 90 by fastener 102. The second leg 104 of gasket retainer 98 is the curled end that is designed to compressibly engage the gasket 94. Such engagement retains the gasket 94 within the gasket channel 96 during assembly of the modular unit of the modular air cleaning system 10.

The access door 28 of the helical filter unit 12 is depicted in its closed and latched position. A door gasket channel 106 is formed at the margin of the access door 28. The door gasket channel 106 is formed in part by bending the end margin of the front face 108 of the access door 28 at a right angle thereto. An inner wall 109 of the access door 28 forms the opposing side of the door gasket channel 106. Retainer strip 110 is positioned between the right angle portion of front face 108 and inner wall 109. Machine screws 112 threaded into bores formed in the right angle portion of front face 108 bear upon the retainer strip 110, causing the retainer strip 110 to compressibly engage the gasket 94. In this manner, the gasket 94 is compressibly contained within door gasket channel 106. When the access door 28 is latched, the gasket 94 is sealingly, compressibly engaged with the abutting corner of the component bearing section 90 of post shell 72.

A generally L shaped latch bracket 114 is affixed, as by welding or by machine screws, to the right angle portion of front face 108 of access door 28. The latch bracket 114 is compressibly engaged by the latch 30 when the latch 30 is in the latched position. Such engagement results in a sealing engagement between gasket 94 and the component bearing section 90 of post shell 72.

Still referring to FIG. 6, the structural panel 32 of the Hepa filter unit 14 is sealingly affixed to the component bearing section 90 of the post shell 72 in a manner that is similar to the aforementioned access door 28. A gasket 94 is retained within a panel gasket channel 116 by being compressed by the action of machine screws 112 acting on a retainer strip 110 mounted between an inner wall 109 and a fight angle portion of the front face 108 of the structural panel 32. A mounting bracket 118 is welded to the component bearing section 90 the post shell 72. A fastener 120 fixedly couples the structural panel 32 to the bracket 118. In so doing, the gasket 94 is sealingly compressed against the corner of the component bearing section 90 of the post shell 72.

FIG. 6 depicts the helical filter unit 12 joined to the Hepa filter unit 14. To accomplish this, the interior sidewall 122 of the helical filter 12 is abutted to the interior sidewall 124 of the Hepa filter unit 14. A relatively lengthy fastener 126 is passed through bores that are formed in the channels 70 of the corner posts 18 of the helical filter unit 12 and the Hepa filter 14 and the interior sidewalls 122, 124, which bores are in registry. To separate the helical filter unit 12 from the Hepa filter unit 14, two shorter fasteners 126 are utilized with one such fastener 126 joining the interior sidewall 122 to the channel 70 to the corner post 18 of the helical filter unit 12 in a similar fastener 126 joining the sidewall 124 to the channel 70 of the corner post 18 of Hepa filter unit 14.

Figure 7:
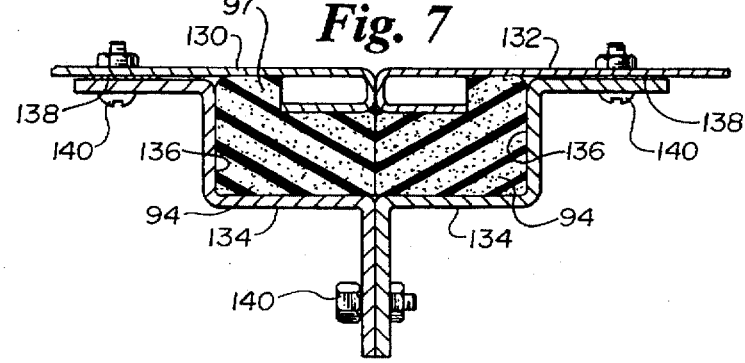
FIG. 7 is an end elevational view of the corner post adapted to join sections of duct work.

FIG. 7 is an adaptation of the gasket channel concept to join two duct work sections. The duct sidewalls 130 and 132 have ends formed in a U shape and abutted against one another. Brackets 134 form a respective duct gasket channel 136 in cooperation with the duct sidewalls 130, 132. The U shaped end of each of the duct sidewalls 130, 132 compressibly engages the gasket 94, holding the gasket 94 in place during joining of the duct work sidewalls 130, 132. A bonding material 138 is disposed between brackets 134 and duct sidewalls 130, 132. Tightening of the three fasteners 140 acts to compress both gaskets 94 and both of the cross sectional axis depicted, thereby effecting a seal along the joint between duct sidewalls 130, 132.

The latches 30 that are commonly used on the access doors of the modular units are depicted in FIGS. 8-12. FIG. 8 depicts the latch 30 mounted in the recess defined between the access door 28 and the corner post 18 of the helical filter unit 12. The latch 30 is depicted in its latched configuration, compressibly engaging the latch bracket 114 of access door 28.

The latch 30 is comprised of two major components; a latch frame 142 and a latch arm 144. The latch frame 142 is a generally L shaped piece of steel barstock. The long arm of the L shaped latch frame 142 is adapted to lie flush on the cabinet wall 146 in the recess formed between the corner post 18 and the access door 28. The latch frame 142 is maintained in position by two cap screws 148 that pass through bores 150, formed in latch frame 142, and bores 152, formed in the cabinet wall 146.

The short leg of the L shaped latch frame 142 has a rod bore 154 defined therein. The end margin of the short leg of the latch frame 142 has an outward bend that presents a ramp face 156 to the latch arm 144.

The latch arm 144 has four subcomponents; the latch arm body 158, the slide actuator 160, the latch rod 162, and the bracket engaging compensator 164.

The latch arm body 158 has a hinged slot 166 that is adapted to slide over the hinge bracket 157. The latch arm body 158 is rotatably engaged with the hinge bracket 157 by clevis pin 168.

The latch arm body 158 further has a central bore 170 defined therein. The central bore 170 has a depth equal to approximately one half the length of the latch arm body 158. A threaded compensator bore 172 is oriented transverse to the central bore 170 and located approximately midway between the end of central bore 170 and the clevis pin 168. A second compensated bore 172a may be formed alongside compensator bore 172, as desired.

Figure 10:
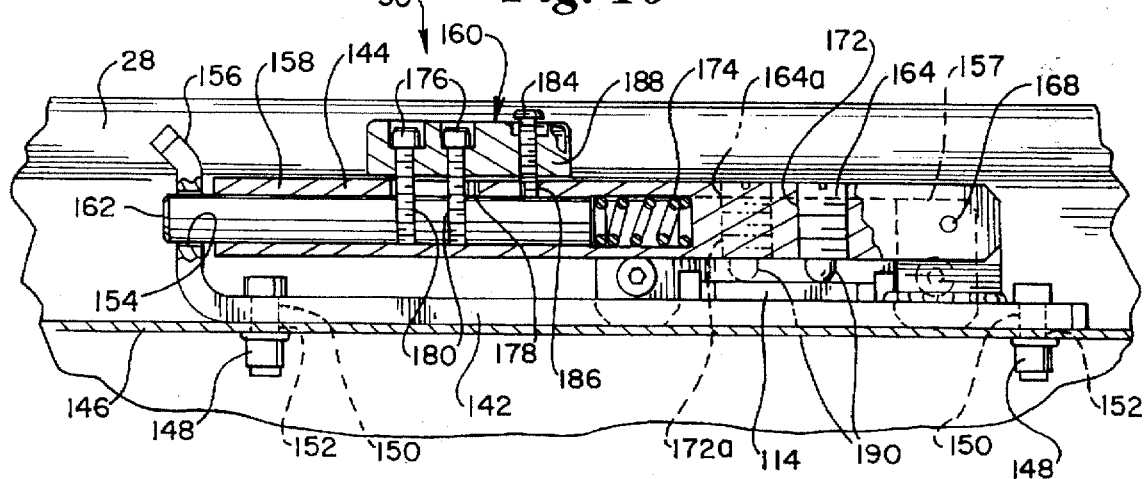
FIG. 10 is a sectional view of an access door latch in a latched position.
Figure 11:
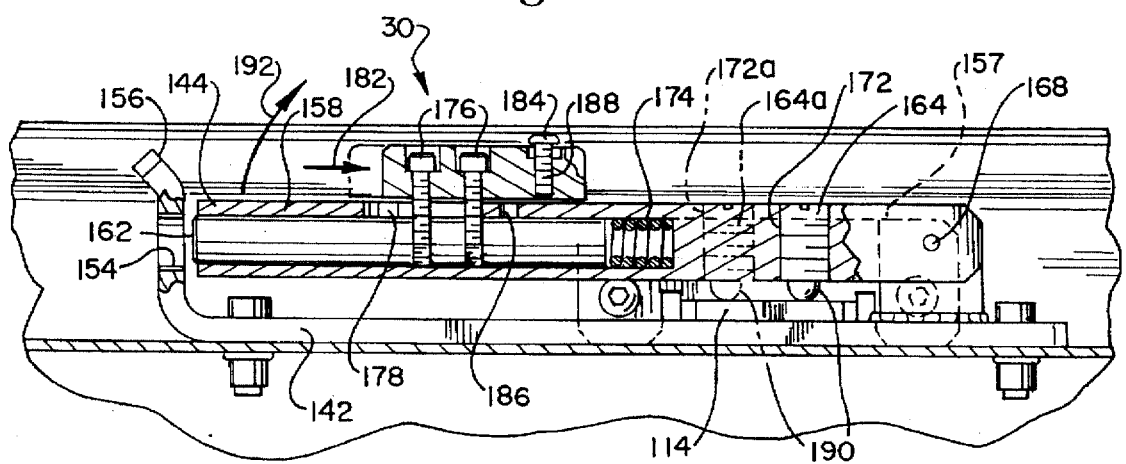
FIG. 11 is a sectional view of a door latch in the unlatched configuration.

The latch rod 162 is slideably disposed within the central bore 170. A coil spring 174 is disposed between the inner end of the latch rod 162 and the interior end of the central bore 170. The spring 174 is held in compression and acts to bias the latch rod 162 to the left, as depicted in FIGS. 10 and 11. In the latched position, as indicated in FIGS. 9 and 10, the latch rod 162 passes through the rod bore 154, thereby holding the latch arm 144 in the latched position.

The slide actuator 160 is slideably mounted on top of the latch arm body 158. The slide actuator 160 is fixedly coupled to the latch rod 162 by two cap screws 176. The cap screws 176 pass through an elongated race track shaped slot 178 formed in the latch arm body 158. The slot 178 intersects the rod bore 154. The cap screws 176 pass through the slot 178 and are threaded into bores 180 formed in latch rod 162. The slot 178 accommodates lateral movement of the slide actuator 160 with respect to the latch arm body 158. Sliding motion to the right, as indicated by arrow 182 in FIG. 11, acts to disengage the latch rod 162 from the rod bore 154 and further compresses spring 174.

Figure 11A:
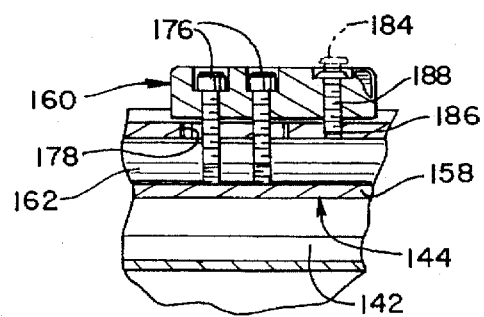
FIG. 11a is a sectional view of the door latch actuator.

A safety lock includes a locking screw 184 that is threadedly engaged in a bore 188 formed in slide actuator 160. In the latched position as indicated in FIGS. 10 and 11a, the locking screw 184 is positioned over a recess 186 formed in the latch arm body 158. Turning the locking screw 184 in to engage the recess 186, as indicated in FIG. 11a, locks the slide the actuator 160 in the latched position, preventing an inadvertent unlocking actuation, the unlocking actuation being as indicated in FIG. 11.

The bracket engaging compensator 164 and the second optional bracket engaging compensator 164a, depicted in phantom, are threadedly engaged in compensator bores 172, 172a respectively. The compensators 164, 164a have spring loaded plungers 190 enclosed therein. The plungers 190 are free to translate within the compensators 164, 164a. The plungers 190 are biased in an extended position. The spring loaded plungers 190 compressively engage the latch 114 of the door 28, holding the access door 28 in a sealed and closed position on the latch 30 is in the latched configuration as indicated in FIGS. 9 and 10.

In operation, a latch 30 is unlatched by manually sliding the slide actuator 160 to the right as indicated by arrow 182 in FIG. 11. This action disengages the latch rod 162 from the rod bore 154. Once the latch rod 162 is disengaged, the latch arm 144 is free to rotate as indicated by arrow 192. Such rotation eventually disengages the spring loaded plungers 190 from the latch bracket 114. The design of the latch 30 is such that the latch arm 144 may be rotated a full 180° from the latched position so that the latch arm 144 is again fully contained within the recess formed between the access door 28 and the corner post 18.

To place the latch 30 in a latched configuration, the access door 28 is first positioned in the closed position. The latch arm 144 of the latch 30 is then rotated in a direction opposite to the arrow 192. The spring 174 urges the latch rod 162 to its full left position as indicated in FIG. 10. As the rotation is continued, the end of the latch rod 162 bears upon the ramp base 156. Continued pressure on the latch arm 144 increases the compression of spring 174 as the latch rod 162 rides down the ramp face 156 and is forced to translate to the right. Prior to the latch rod 162 engaging the rod bore 154, the spring loaded plungers 190 again come in contact with the latch bracket 114 of the access door 28, thereby forcing the access door 28 into its sealed, closed position.

The access doors 28 are typically maintained in a closed position for many months at a time. The access doors 28 may then be opened for a very short period of time, as for example to perform a visual check of the interior components of the modular unit or to replace an expandable filter component. A characteristic of the closed cell material used in the gaskets 94 is that such gaskets 94 take a set after a period of time of being compressed. Due to the closed cell nature of the gaskets 94, it takes a substantial period of time, extending over as much as several hours, to remove this set from the gasket 94 once the compressive forces are removed. In such circumstances, the gasket 94 of the access door 20 may still have its previous set when it is time to again close the access door 28. In such a situation, an effective seal between the gasket 94 of the access door 28 and the compressively engaging portion of the unit may not be possible. To account for this condition, the spring loaded plungers 190 of the bracket engaging compensators 164, 164a extend and compressively engage the latch bracket 114, even though the gasket 94 of the access door 28 still has its compressed set. Over a period of time after the access door 28 is closed, the set of the gasket 94 is adjusted responsive to the compressive forces exerted thereon, the force exerted by the spring loaded plungers 190 and the countering force exerted by the gasket 94 reach a point of equilibrium in which the gasket 94 is held in its desired compressive sealing state.

FIGS. 12 and 13 depict the suspension and latching hardware of the side hinged access door 28 with respect to the latch 30. The latch 114 is depicted as affixed to the recess side 200 of access door 28. The latch bracket 114 is affixed in such position by machine screws 202. The latching portion of the latch bracket 114 extends to the left from access door 28 as depicted in FIG. 12 and underlies the latch arm 144 of the latch 30. The hinge 204 is a clevice-type hinge. The clevice bracket 206 is affixed to the component bearing section 90 of the corner post 18. The clevice bracket 206 has a groove 208 defined therein. The hinge tongue 210 is affixed to the access door 28. An elongated pin slot 212 is defined in both ears of the clevice bracket 206. The pin 214 is passed through the pin slots 212 and a bore formed in the hinge tongue 210. The elongated pin slot 212 permits the access door 28 to move laterally with respect to the cabinet wall 146.

FIG. 14 depicts a bottom hinged access door 40 or 42 of the type utilized on a Hepa filter unit 14. A similar clevice hinge 204 is utilized to support the access door 40.

In operation, to open an access door 28, 40, the latch 30 is unlatched as previously described and rotated as indicated by the arrow 216 in FIG. 12 to the open position in which the latch 30 lies in the recess. The latch 30, as depicted in FIG. 14, is shown in the fully opened position resting within such recess. The access door 28, 40 can then be pulled away from its seated closed position by sliding the pin 214 in the pin slot 212 to its furthest outward position as depicted in FIGS. 13 and 14. This action frees the gasket 94 from its seat and allows opening rotation of the access door 28, 40 without scuffing the gasket 94 and free of interference by the opened latch 30 positioned within the recess.

In closing the access doors 28, 40, the access door 28, 40 is rotated to the closed position, but is spaced slightly apart from engagement with the cabinet wall 146. In this manner, the access door 28, 40 is aligned in its closed position without scuffing the gasket 94. As the latches 30 are then closed, compression of the gasket 94 occurs and the door moves inward to its seated position against the cabinet wall 146. In such movement, the pin 214 of the hinges 204 moves inward in the pin slot 212.

Various components utilized for supporting and replacing the Hepa filters 220 within the Hepa filter unit 14 are depicted in FIGS. 15–20. The Hepa filters 220 are the only components of the modular air cleaning system 10 that are expendable and require periodic replacement. Because of the very thorough cleansing action of the helical filter unit 12, the Hepa filters 220 typically may be used for a number of months or even more than a year before replacement is necessary. It is understood that the time interval between replacement is, however, dependant upon the nature and quantity of unwanted contaminant materials that are borne by the air flow.

The Hepa filter unit 14 in the depicted preferred embodiment is designed to hold four commercially available Hepa filters 220. The Hepa filters 220 are mounted in pairs with two pairs being disposed in racks that are abreast of one another.

Figure 15:
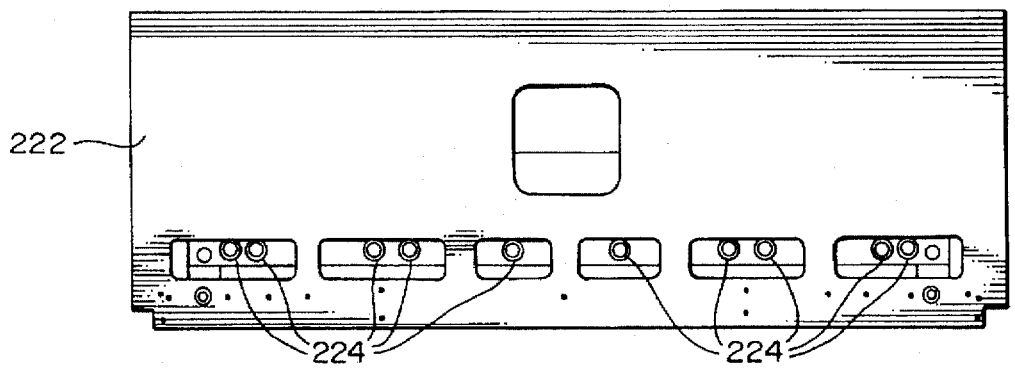
FIG. 15 is a side elevational view of the Hepa filter mounting rack.

As depicted in FIG. 15, the Hepa filters 220 are supported by a roller plate 222. A plurality of rollers 224 are affixed to the roller plate 222 by nuts 226. The roller plates 222 on opposite sides of the Hepa filters 220 each have inwardly directed rollers 224 upon which the lower margin of the Hepa filters are supported.

The rollers 224 have a roller cylinder 228. Are preferably made of brass. The roller cylinder 228 is mounted concentric with an axle 230 and rides on circular bearings disposed between the axle 230 and the inner surface of the roller cylinder 228. The cap 234 is affixed to the end of the axle 230 to limit the lateral motion of the roller cylinder 228. The opposing end of the axle 230 from the cap 234 is threaded to receive the nut 226. The roller plate 22 is mounted such that the roller plate 222 is capable of both vertical and horizontal translation.

The flow of air to be cleansed is drawn in through the bottom of the Hepa filters 220 and exhausted from the top thereof. Accordingly, a seal is needed around the top margin of the pair of Hepa filters 220 in order to force the airstream to pass through the Hepa filters 220. To facilitate such sealing, a removable gasket frame 236 is positioned above the Hepa filters 220. The gasket frame 226 has a downward directed gasket 94 positioned to mate with the gasket that is positioned around the top margin of each of the Hepa filters 220. The gasket frame 236 is also seated against frame support 238. The frame support 238 is bolted to cross members 242 of the Hepa filter unit 14.

The Hepa filters 220 must be free of a sealing engagement with the gasket 94 of the gasket frame 236 during removal and installation of such Hepa filters 220. Accordingly, a snubbing mechanism is provided to engage and disengage the Hepa filters 220 from the gasket 94. Each roller plate 222 has associated with it a front and a back over center lever 246. By providing such lever 246 at both and the front and the back of the Hepa filter unit 14, the Hepa filters 220 may be removed and installed from either the front or the back of the Hepa filter unit 14, as desired.

The over center levers 246 each have two pivot points; a lower anchor pivot point 248 and an upper roller pivot point 250. The pivot points 248, 250 are spaced apart on the over center lever 246. Accordingly, rotation of the over center lever 246 about the anchor pivot point 248 results in the roller pivot point 250 translating in an upwardly directed arc about the anchor pivot point 248.

Figure 15A:
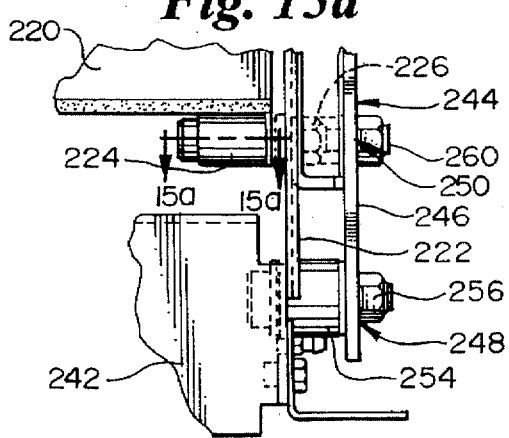
FIG. 15a is an end elevational view of a Hepa filter supporting roller.
Figure 15B:
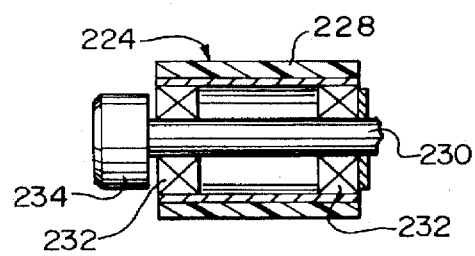
Figure 16:
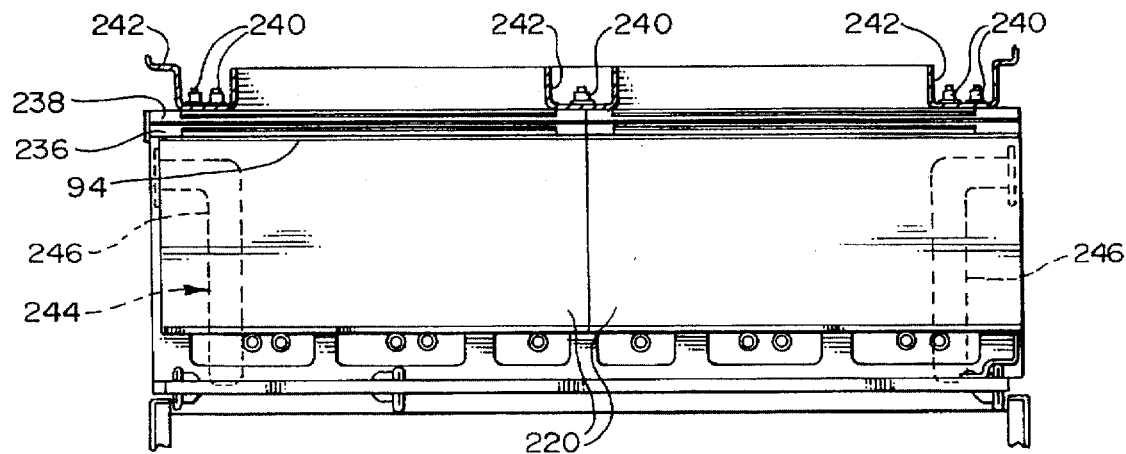
FIG. 16 is a side elevational view of two Hepa filters mounted within the Hepa filter unit in the sealed snubbed position with the over center snubber levers in phantom.
Figure 17:
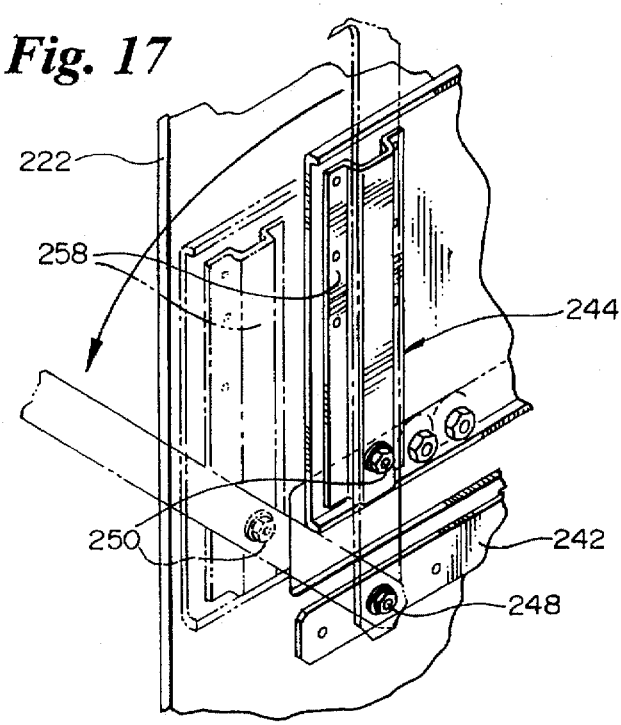
FIG. 17 is a perspective view of the over center snubber arm and a portion of the Hepa filter mounting rack.

The snubbing mechanism 244 is best depicted in FIGS. 15a and 17. The anchor pivot point 248 is formed by a bolt passing through a bore (not shown) located proximate the lower margin of the over center lever 246. The bolt 252 is anchored in the cross member supporting structure 242. A spacer bushing 254 is disposed on the bolt between cross member 242 and over center lever 246. A nut 256 is threaded onto the bolt 252. Since the bolt 252 is anchored in the cross member 242, the anchor pivot point 248 is fixed in position with respect to the Hepa filter unit 14.

A bracket 258 is affixed to the roller plate 222. The roller pivot point 250 is formed by a nut and bolt that pass through bores formed in the bracket 248 and the over center lever 246. The over center lever 246 is a transverse flat plate at the second end thereof that comprises a handle 262.

Figure 17A:
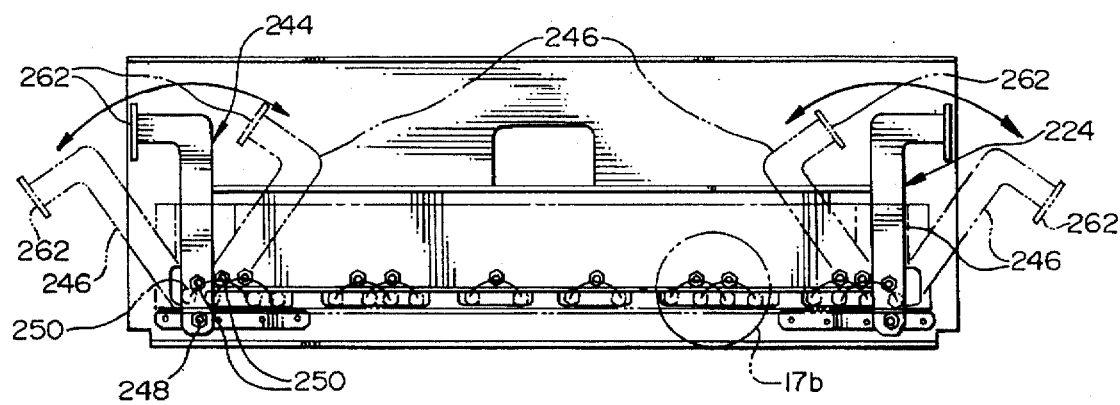
FIG. 17a is a side elevational view depicting the rotational action of the over center snubber levers.
Figure 17B:
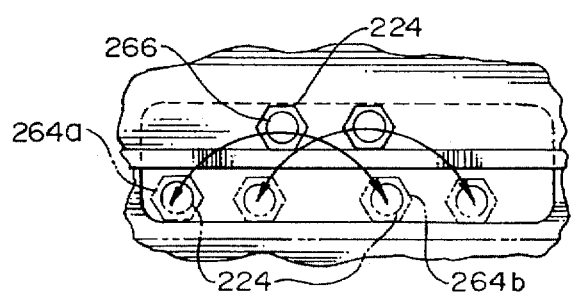
FIG. 17b is a representation of the motion of the hinge point of the over center snubber levers.

FIGS. 17a and 17b are referred to for the operation of snubbing mechanism 244. As previously indicated, the Hepa filters 220 can be loaded from either the front or the rear sides of the Hepa filter unit 14. Assuming that the Hepa filters have been loaded from the left side as depicted in FIG. 17a, both of the over center levers 246 are positioned in their left most rotation. This position corresponds to the position 264a of the rollers 224 as depicted in FIG. 17b. To snub the Hepa filters up tight against the gasket 94 of the gasket frame 236, hand pressure is exerted on the handle 262. This pressure causes the rotation of over center levers 246 to the right to the upright position. Such rotation causes the rollers 224 to translate to the fight and to rise. At the apex of the rotation, as indicated in the snubbed position 266, the Hepa filters are snubbed and sealed against the gasket 94. In the instance in which the Hepa filters 220 have been put in place on the right side as indicated in FIG. 17a, the two over center levers 246 would be in their right most disposition. This position corresponds to the free position 264b of the rollers 224 as indicated in FIG. 17b. Snubbing the Hepa filters is accomplished by putting rotational pressure on the handle 262 of the fight most over center lever 246. The resulting rotation causes the Hepa filter bearing rollers 224 to translate to the left from the free position 264b to the snubbed position 266.

Figure 18:
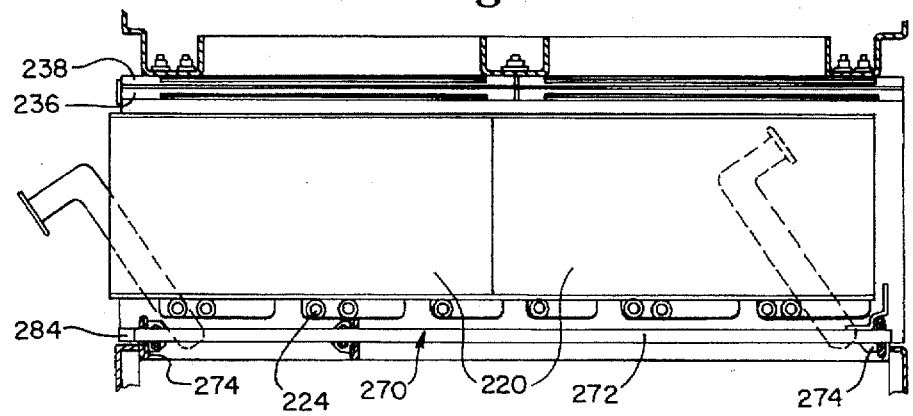
FIG. 18 is a side elevational view of the Hepa filter in the lowered, released position and Hepa filter snubber levers.
Figure 19:
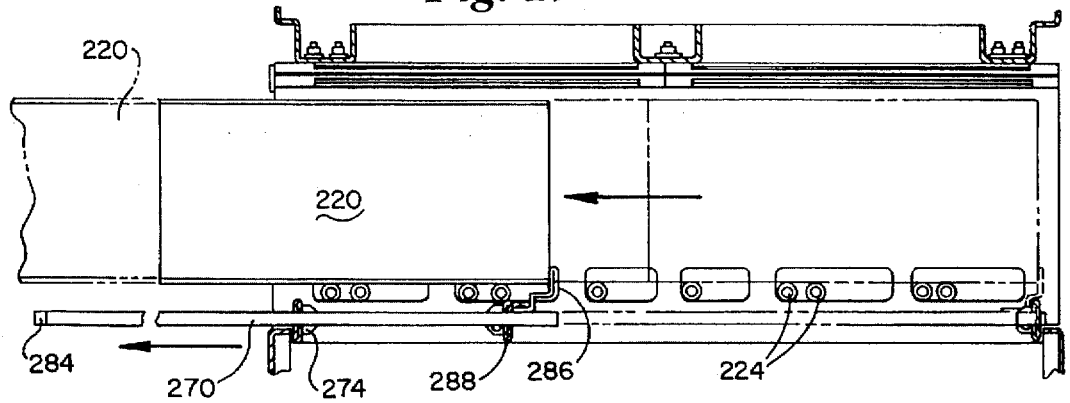
FIG. 19 is a side elevational view of the release bar engaged with the rear face of a Hepa filter.
Figure 20:
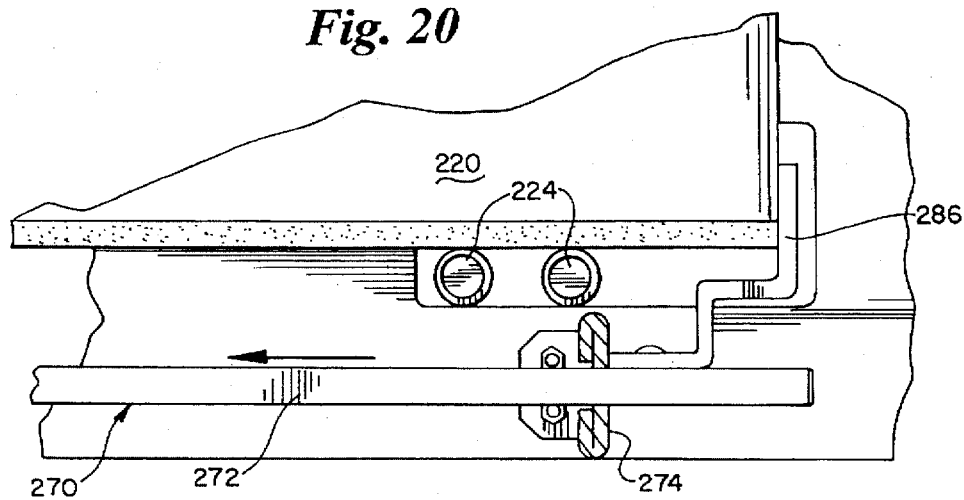
FIG. 20 is a side elevational view of the release bar rear face engaging hook.
Figure 21:
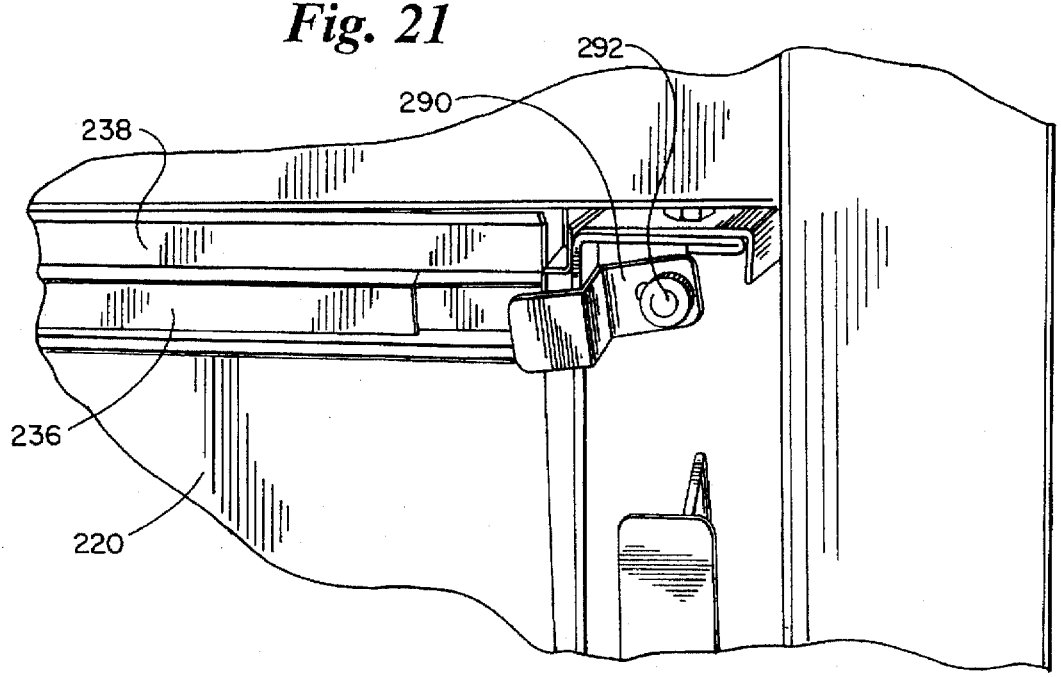
FIG. 21 is a perspective view of the gasket frame retaining the tab.

The Hepa filters 220 weight approximately 30 pounds when installed clean and may weight as much as 50 pounds when removed after filters unwanted material from the air stream. Referring to FIGS. 18–20, a removal device 270 is positioned beneath the rollers 224 supporting the Hepa filters 220. The removal device 270 is comprised of an elongated rod 272. The rod 272 is translatably borne in end brackets 274. A T-shaped handle 284 is affixed to a first end of the rod 272. A filter engaging finger 286 is affixed to the rod 272 proximate the second end of the rod 272. The filter engaging finger 286 projects upward behind the Hepa filter 220. A stop bracket 288 supports the rod 272 and is positioned approximately one-third of the rod's length from the handle 284.

In operation, a maintenance person grasps the T handle 284 and pulls to the left as depicted in FIGS. 18–20. The filter engaging FIG. 286 abuts the rearmost Hepa filter 220 and advances both of the Hepa filters 220 towards the left towards the maintenance person. In FIG. 19, the first Hepa filter 220, which is depicted in phantom, of the pair of Hepa filters 220 has been removed. At this point the filter engaging finger 286 abuts the stop bracket 288, preventing the further advancement of the second Hepa filter 220 toward the maintenance person. Stop bracket 288 prevents the maintenance person from advancing the second Hepa filter 220 to the point where it falls free from Hepa filter unit 14 to potentially injure the maintenance person.

When the Hepa filters 220 are in the free position 264a as depicted in FIG. 18, the gasket frame 236 is free of compressive engagement with the frame support 238. In order to prevent the gasket frame 236 from pulling out of the Hepa filter unit 14 when the Hepa filters 220 are removed, a stay bracket 290 is utilized. The stay bracket 290 is held in place by a thumb screw 292.

Figure 22:
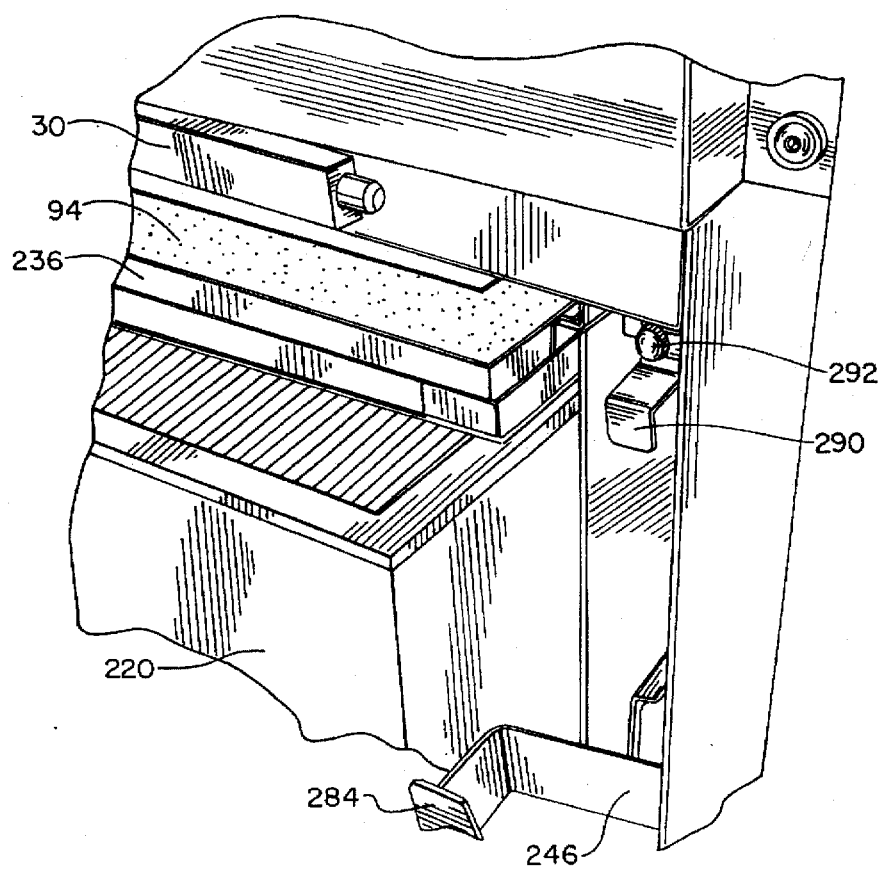
FIG. 22 is a perspective view of the gasket frame and Hepa filter partially removed from the Hepa filter unit.

As indicated in FIG. 22, the gasket frame 236 is readily removable from the Hepa filter unit 14 by loosening the stay bracket 290 by means of the thumb screw 292 and rotating the stay bracket 290 out of the way gasket frame 236 is depicted as being partially withdrawn from Hepa filter unit 14 and simply continuing to pull on the gasket frame 236 will result in its removal from the Hepa filter unit 14. Such removal facilitates the replacement of gasket 94 within the gasket frame 236, as needed.

Figure 23:
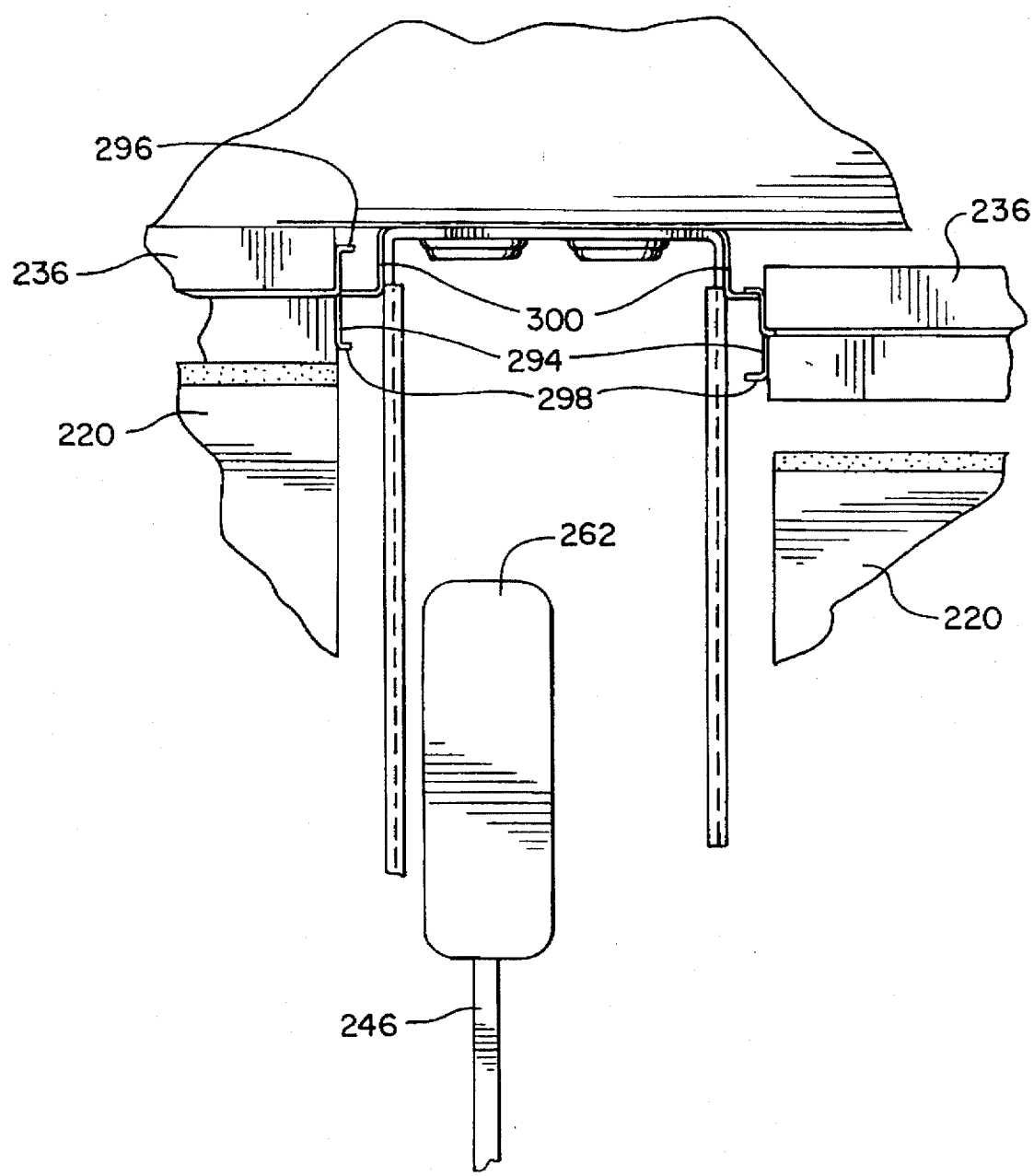
FIG. 23 is a front view of a portion of adjacent Hepa filters depicting the left Hepa filter in the snubbed position and the right Hepa filter in the released position.

As depicted in FIG. 23, the gasket frame 236 is held loosely in place within Hepa filter unit 14 by a two-pronged bracket 294. When the gasket frame 236 is inserted into the Hepa filter unit 14, the upper prong 296 of the bracket 294 is positioned above the retaining bracket 300 and the lower prong 298 of bracket 294 is positioned beneath the retaining bracket 300. The retaining bracket 300 is fixedly coupled to the cross member 242 of the Hepa filter unit 14.

The right Hepa filter 220 as depicted in FIG. 23 is in its lowered, free position. In such position, the gasket frame 236 drops down and is supported by the upper prong 296 resting on the retaining bracket 300.

The Hepa filter 220 as depicted on the left in FIG. 23 is in its up and snubbed position. Accordingly, the over center lever 246 is depicted in its upper most position. When the Hepa filter 220 is snubbed up against the gasket frame 236, the gasket frame 236 is supported by the compressive forces exerted by the Hepa filter 220. In such condition, the two-pronged bracket 294 plays no role in supporting the gasket frame 236.

Figure 24:
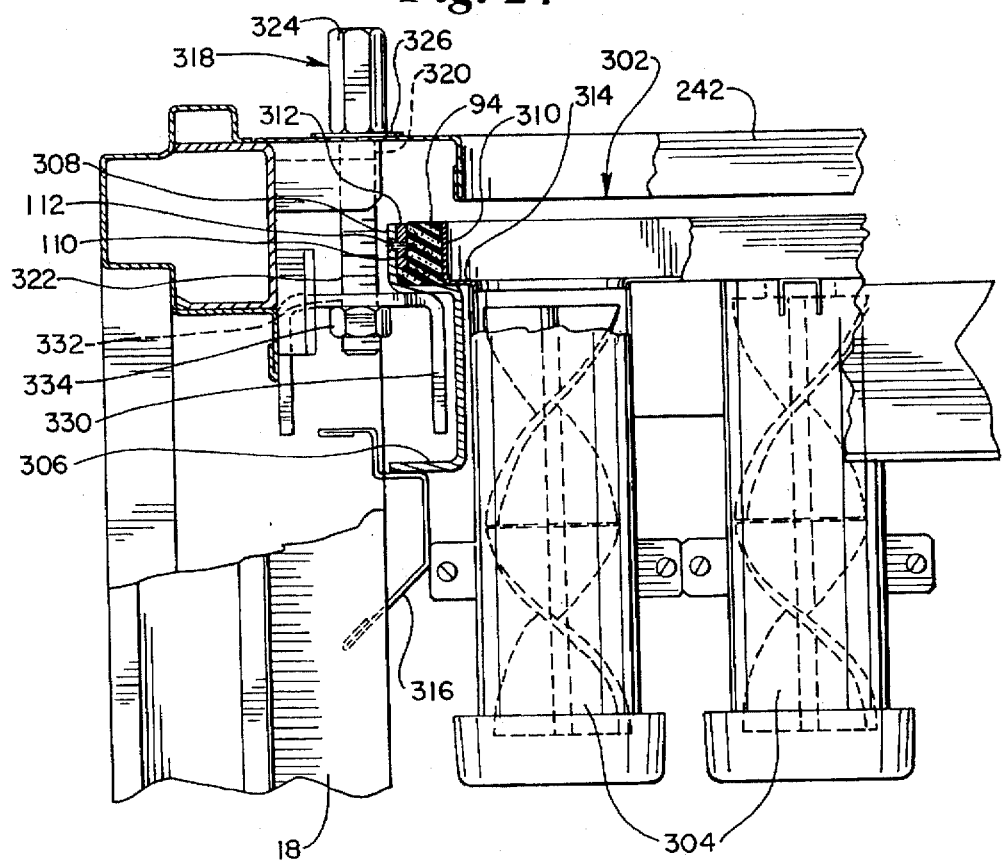
FIG. 24 is a front view of a portion of the helical filter unit with a portion of the corner post broken away to view the helical filter support structure.
Figure 25:
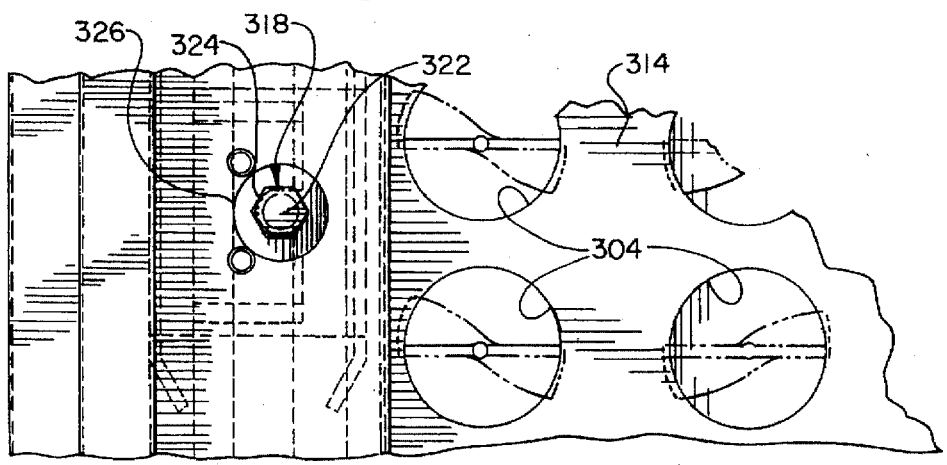
FIG. 25 is a top view of the helical filter jacking unit.

The disposition of the helical filter tray 302 within the helical filter unit 12 is depicted in FIGS. 24–25. The helical filter tray 302 is comprised of an array of helix tubes 304. Each of the helix tubes 304 is preferably formed of a steel material and has a helical pathway (not shown) defined therein. The helix tubes 304 are made in accordance with U.S. Pat. No. 4,460,386. Depending on the application, a helical filter tray 302 may include twenty or more helix tubes 304.

The helical filter tray 302 is supported on both sides by a tray frame 306. The tray frame 306 is a generally U-shaped channel and has an upwardly directed gasket tang 308. The gasket tang 308 acts cooperatively with the backing plate 310 to form a gasket channel 312.

A gasket 94 is disposed within the gasket channel 312. The gasket 94 is held within the gasket channel 312 by a retainer strip 110. The retainer strip 110 acts to compress the gasket 94 between the retainer strip 110 and the backing plate 310 by means of machine screws 112 acting on the retainer strip 110.

The backing plate 310 is an extension of the tray 314 from which the array of helix tubes 304 depend. When viewed from the top, the tray 314 has an appearance not unlike a baking utensil for cupcakes, having a series of geometrically arranged depressions, comprising the helix tubes 304, disposed within the tray 314.

A step support 316 is formed at both sides of the opening in the helical filter unit 12 in which the helical filter tray 302 is disposed. The underside of the tray frame 306 rests on and is supported by the step support 316 to facilitate sliding the helical filter tray 302 into the helical filter unit 12. A jacking unit 318 is positioned on either side of the helical filter tray 302. The jacking unit 318 depends from a bore 320 formed in the cross member 242.

The jacking unit 318 is comprised of an elongated threaded bolt 322. The bolt 322 passes through the bore 320 and is threadedly engaged with nut 324. A washer 326 disposed between the nut 324 and the upper surface of the cross member 242 assists in supporting the jacking unit 318.

A U-shaped support bracket 330 has a bore 332 defined therein. A nut 334 is affixed to the support bracket in registry with the bore 332 as by welding. The bolt 322 is passed through the bore 332 and threaded into nut 334.

Figure 24A:
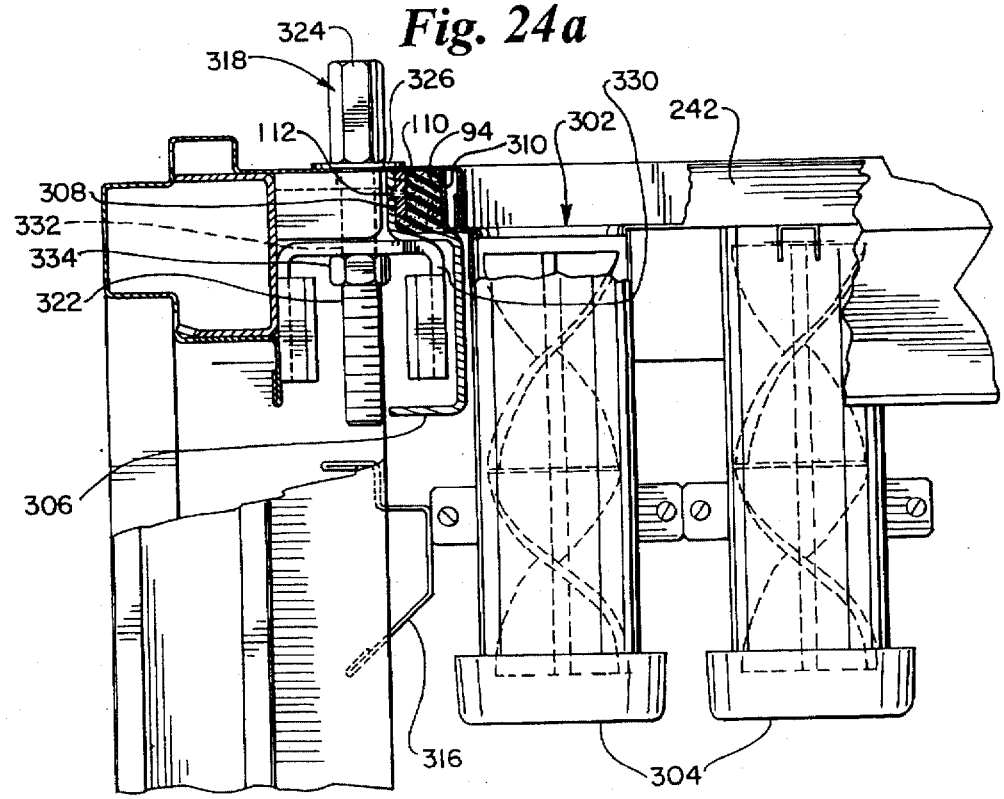
FIG. 24a is a front view of a portion of the helical filter unit with a portion of the corner post broken away to view the helical filter support structure in the sealed position.

The jacking unit 318 is disposed approximately half way into the opening in the helical filter unit 12 in which the helical filter tray 302 is installed. Accordingly, during installation, as the helical filter tray 302 is advanced into such opening, the undersigned of the tray frame 306 rides on top of the upper side of the support bracket 330. When the helical filter tray 302 is fully advanced into the opening defined in the helical filter unit 12, the nut 324 is rotated thereby drawing the helical filter tray 302 up into the position as depicted in FIG. 24a. Such action causes the gasket 94 to be seated on the underside of the cross member 242. It should be noted that the gasket is substantially isolated by surrounding structure from coming into contact with the contaminated air flow that passes through the helix tubes 304 during operation.

Figure 26:
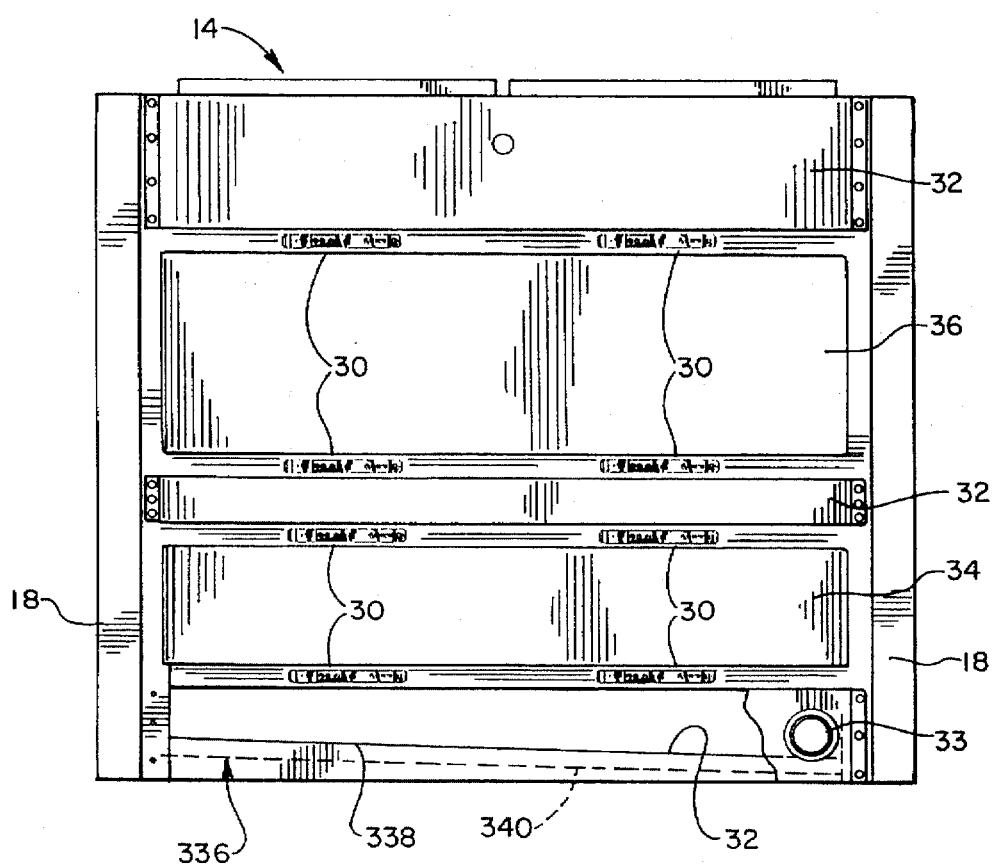
FIG. 26 is a front view of the Hepa filter unit with the drip tray depicted in the lower portion thereof.

FIG. 26 depicts Hepa filter unit 14. A drip tray 336 is disposed at the bottom of Hepa filter unit 14. A similarly constructed drip tray 336 is disposed in the bottom portion of the helical filter unit 12.

The drip tray 336 is comprised of a stainless steel tray having inwardly sloping sides 338 coupled to a sloped floor 340. The sloped floor 340 slopes toward the drain 33 so that liquid material captured by the drip tray 336 is free to flow from the drain 33. It should be noted that a similar drain 33 is formed on the rear side of the Hepa filter unit 14.

Figure 27:
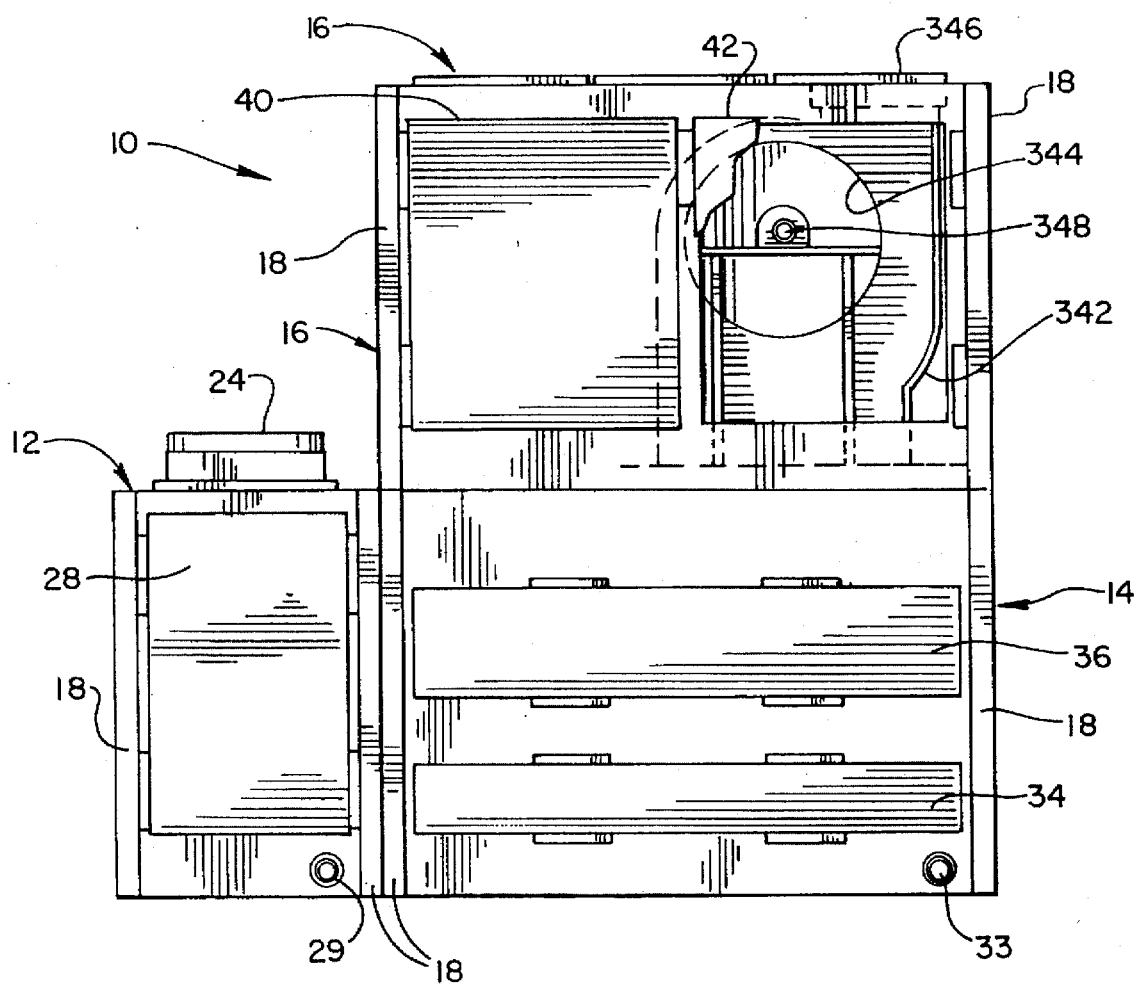
FIG. 27 is a front view of the modular air cleaning system with a portion of the fan and motor unit broken away to show the fan.

FIG. 27 depicts the modular air cleaning system 10. A portion of the fan and motor unit 16 is broken away to show a conventional squirrel-cage type fan 342. The fan 342 has an axially oriented inlet 344 and an exhaust 346 that exhausts out the top of fan and motor unit 16. A rotor-type fan blower (not shown) rotates about the rotor axle 348.

While there has been shown and described the preferred embodiment of the modular air cleaning system of the present invention, it is understood that changes in the structures and sizes and materials may be made by those skilled in the art without departing from the present invention. The present invention is defined in the following claims.

I claim:

1. A substantially sealed modular air handling system having a plurality of modules enclosing a plurality of air handling units, each of said modules having generally parallelpiped shaped cabinetry having two opposed sides and opposed front and rear faces, the plurality of air handling units having a plurality of common components designed to seal and readily mate the modules to one another in a plurality of selected configurations, to provide ready access to the air handling units enclosed therein via the front and rear faces thereof and to present an external surface of the cabinetry that is substantially planar and is substantially free of protruding devices which may pose a safety hazard to personnel, wherein a selected one of the common components is an access door latch, the access door latch being disposed in a recess defined in the substantially planar external surface of the cabinetry and having a latch frame operably, fixedly coupled to the cabinetry, the latch frame presenting an outwardly directed surface having a first flush portion disposed flush with the external surface of the cabinetry.

2. A substantially sealed modular air handling system as claimed in claim 1 further including access doors for ready accessing the air handling units enclosed in said modular cabinetry, the access doors being operably coupled to openings defined in the front and rear faces of said cabinetry, each access door being sealed by a sealing gasket and having at least one access door latch, the access door latch having a biased compensator to effect a sealing engagement of the sealing gasket without regard for the condition of compression of the sealing gasket at the time of closing each respective access door and thereafter.

3. A substantially sealed modular air handling system having a plurality of modules enclosing a plurality of air handling units, each of said modules having generally parallelpiped shaped cabinetry having two opposed sides and opposed front and rear faces, the plurality of air handling units having a plurality of common components designed to seal and readily mate the modules to one another in a plurality of selected configurations, to provide ready access to the air handling units enclosed therein via the front and rear faces thereof and to present an external surface of the cabinetry that is substantially free of protruding devices which may pose a safety hazard to personnel, wherein a selected one of the common components is an access door latch, the air handling units including access doors for ready accessing the air handling units enclosed in said modular cabinetry, the access doors being operably coupled to openings defined in the front and rear faces of said cabinetry, each access door being sealed by a sealing gasket and having at least one access door latch, the access door latch having a biased compensator to effect a sealing engagement of the sealing gasket without regard for the condition of compression of the sealing gasket at the time of closing each respective access door and thereafter, wherein the access door latch is selectively positionable between a latched and an unlatched configuration, the system further including a safety lock, the safety lock selectively imposing a physical barrier to the unlatching of the latch, the safety lock requiring separate unlocking action from the action required to unlatch the latch.

4. A substantially sealed modular air handling system having a plurality of modules enclosing a plurality of air handling units, each of said modules having generally parallelpiped shaped cabinetry having two opposed sides and opposed front and rear faces, the plurality of air handling units having a plurality of common components designed to seal and readily mate the modules to one another in a plurality of selected configurations, to provide ready access to the air handling units enclosed therein via the front and rear faces thereof and to present an external surface of the cabinetry that is substantially free of protruding devices which may pose a safety hazard to personnel, wherein a selected one of the common components is an access door latch, the latch comprising:

a latch frame operably, fixedly coupled to the cabinetry, the latch frame having a first flush portion disposed flush with the cabinetry and a second transverse portion formed transverse to the flush portion at a first end of the flush portion, a rod bore being defined in said second transverse portion, the latch frame having a hinge bracket fixedly joined to the first flush portion proximate a second end thereof;

a latch arm body being operably, rotatably coupled to the hinge bracket and having an axial bore defined therein;

a latch rod slideably disposed within the axial bore, being biased in a locked, distended disposition with respect to the latch arm body to engage said rod bore defined in said second transverse portion of the latch frame; and compensator means for compensating for an amount of compressibility of the sealing gasket of the access door, the compensator means being disposed within the latch arm body and variably compressively engaging the access door latch bracket when the latch rod is in the locked disposition engaged with said rod bore defined in said second transverse portion of the latch frame.

5. The modular air handling system of claim 4 wherein said latch rod has a locking indent defined therein and a selectively engageable safety lock disposed within the latch arm body, the safety lock being engageable with the locking indent of the latch rod when the latch rod is in the locked disposition.

6. The modular air handling system of claim 4 wherein the compensator means comprises a biased plunger having a spring acting thereon for biasing the plunger into compressive engagement with the access door latch bracket when the latch rod is in the locked disposition engaged with said rod bore defined in said second transverse portion of the latch frame.

7. The modular air handling system of claim 6 wherein a rate of the spring action of the plunger spring has a selected relationship to the amount of compressibility of the sealing gasket of the access door such that a state of equilibrium is achieved over time between the compressive force exerted by the latch on the access door and the compressive force exerted by the sealing gasket on the cabinetry.

8. The modular air handling system of claim 7 being adapted for incorporation in a substantially sealed modular air handling system having a plurality of modules enclosing a plurality of air handling units.

9. A substantially sealed modular air handling system as claimed in claim 2 wherein the access door latch is selectively positionable between a latched and an unlatched configuration, the system further including a safety lock, the safety lock selectively imposing a physical barrier to the unlatching of the latch, the safety lock requiring separate unlocking action from the action required to unlatch the latch.

* * * * *

UNITED STATES PATENT AND TRADEMARK OFFICE
CERTIFICATE OF CORRECTION

PATENT NO. : 5,669,947
DATED : September 23, 1997
INVENTOR(S) : Diachuk

It is certified that error appears in the above-indentified patent and that said Letters Patent is hereby corrected as shown below:

Cover page, Other Publications, delete "Hienz" and insert --Hinds--.

Column 1, line 57, delete "-" between "installed" and "in".

Column 4, line 65, delete "wails" and insert --walls--.

Column 5, line 21, delete "Cabinet" and insert --cabinet--.

Column 5, line 44, delete "de" and insert --be--.

Column 6, line 15, delete "system" and insert --systems--.

Column 6, line 21, delete "The" and insert --In the--.

Column 8, line 61, insert "of" between "90" and "the".

Column 9, line 10, delete "in" and insert --and--.

Column 10, line 19, delete "the" between "slide" and "actuator".

UNITED STATES PATENT AND TRADEMARK OFFICE
CERTIFICATE OF CORRECTION

PATENT NO. : 5,669,947
DATED : September 23, 1997
INVENTOR(S) : Diachuk

It is certified that error appears in the above-indentified patent and that said Letters Patent is hereby corrected as shown below:

Column 10, line 31, delete "on" and insert --when--.

Column 12, line 23, delete "22" and insert --222--.

Column 12, line 45, delete "and" between "both" and "the".

Column 13, lines 29 and 30, delete "weight" and insert --weigh--.

Column 13, line 31, delete filters" and insert --filtering--.

Column 15, line 7, delete "undersigned" and insert --underside--.

Signed and Sealed this

Eighteenth Day of August, 1998

Attest:

BRUCE LEHMAN

Attesting Officer

Commissioner of Patents and Trademarks